United States Patent

Dunne et al.

[15] 3,661,051
[45] May 9, 1972

[54] PROGRAMMED MANIPULATOR APPARATUS

[72] Inventors: Maurice J. Dunne; Joseph F. Engelberger, both of Newtown; Horace L. Gardner, Ridgefield; Torsten H. Lindbom, Newtown, all of Conn.

[73] Assignee: Unimation, Inc., Bethel, Conn.

[22] Filed: Aug. 18, 1970

[21] Appl. No.: 64,802

Related U.S. Application Data

[63] Continuation of Ser. No. 808,152, Mar. 18, 1969, abandoned.

[52] U.S. Cl. ................................................................91/35
[51] Int. Cl. ...........................................................F15b 21/02
[58] Field of Search ..............................91/35–38; 340/344; 235/151.1; 318/39

[56] References Cited

UNITED STATES PATENTS

| | | | |
|---|---|---|---|
| 2,927,258 | 3/1960 | Lippel | 318/39 |
| 2,937,325 | 5/1960 | Garber | 91/37 X |
| 3,269,013 | 8/1966 | Bullard | 91/37 X |
| 3,291,971 | 12/1966 | Dunne | 235/151.1 |
| 3,293,636 | 12/1966 | Dunne | 340/347 |
| 3,416,407 | 12/1968 | Renner et al. | 91/36 |
| 2,937,325 | 5/1960 | Garber | 91/37 X |
| 3,269,013 | 8/1966 | Bullard | 91/37 X |
| 3,416,407 | 12/1968 | Renner et al. | 91/36 |

*Primary Examiner*—Everette A. Powell, Jr.
*Attorney*—Mason, Kolehmainen, Rathburn & Wyss

[57] ABSTRACT

A programmed manipulator apparatus employs a continuously rotating memory drum in which may be stored signals representing a number of steps in a desired sequence of operations. A portable teach control assembly is employed during the teaching operation to establish a desired position of the manipulator arm which is then recorded on the memory drum.

During repetitive work cycles, the recorded signals are used as command signals and are compared with encoder signals representing absolute position to move the manipulator arm to each set of positions in sequence. The manipulator arm may be moved over curved paths by employing artificial coincidence signals which are developed while large error signals still exist in the controlled axes. A common comparator and digital-to-analog converter is employed for all of the controlled axes which provides coincidence signals representing different magnitudes of error.

29 Claims, 24 Drawing Figures

PATENTED MAY 9 1972 3,661,051
SHEET 01 OF 13

INVENTORS:
MAURICE J. DUNNE
JOSEPH F. ENGELBERGER
HORACE L. GARDNER
TORSTEN H. LINDBOM

By Mason, Kolehmainen,
Rathburn & Wyss
Attorneys

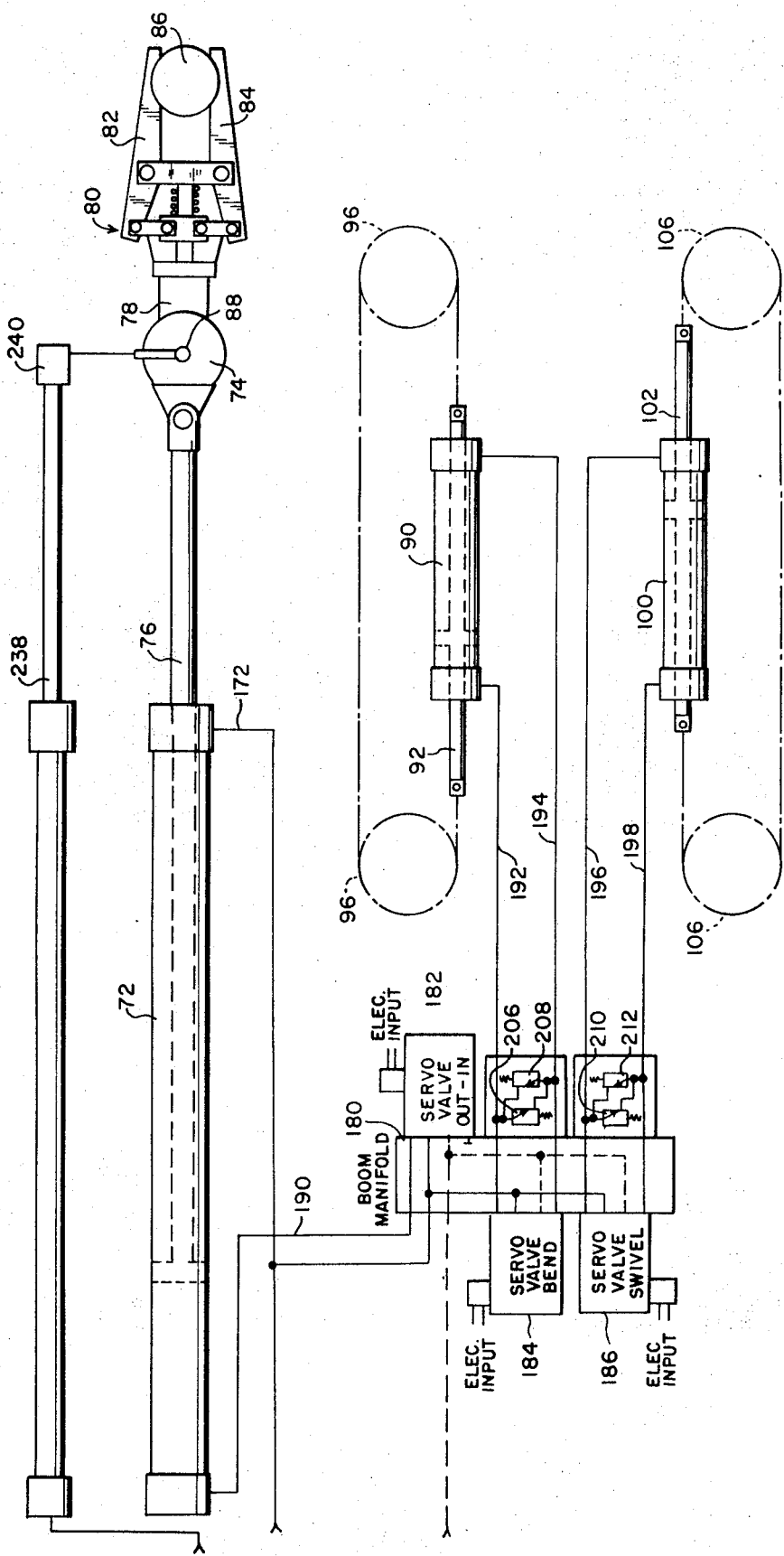

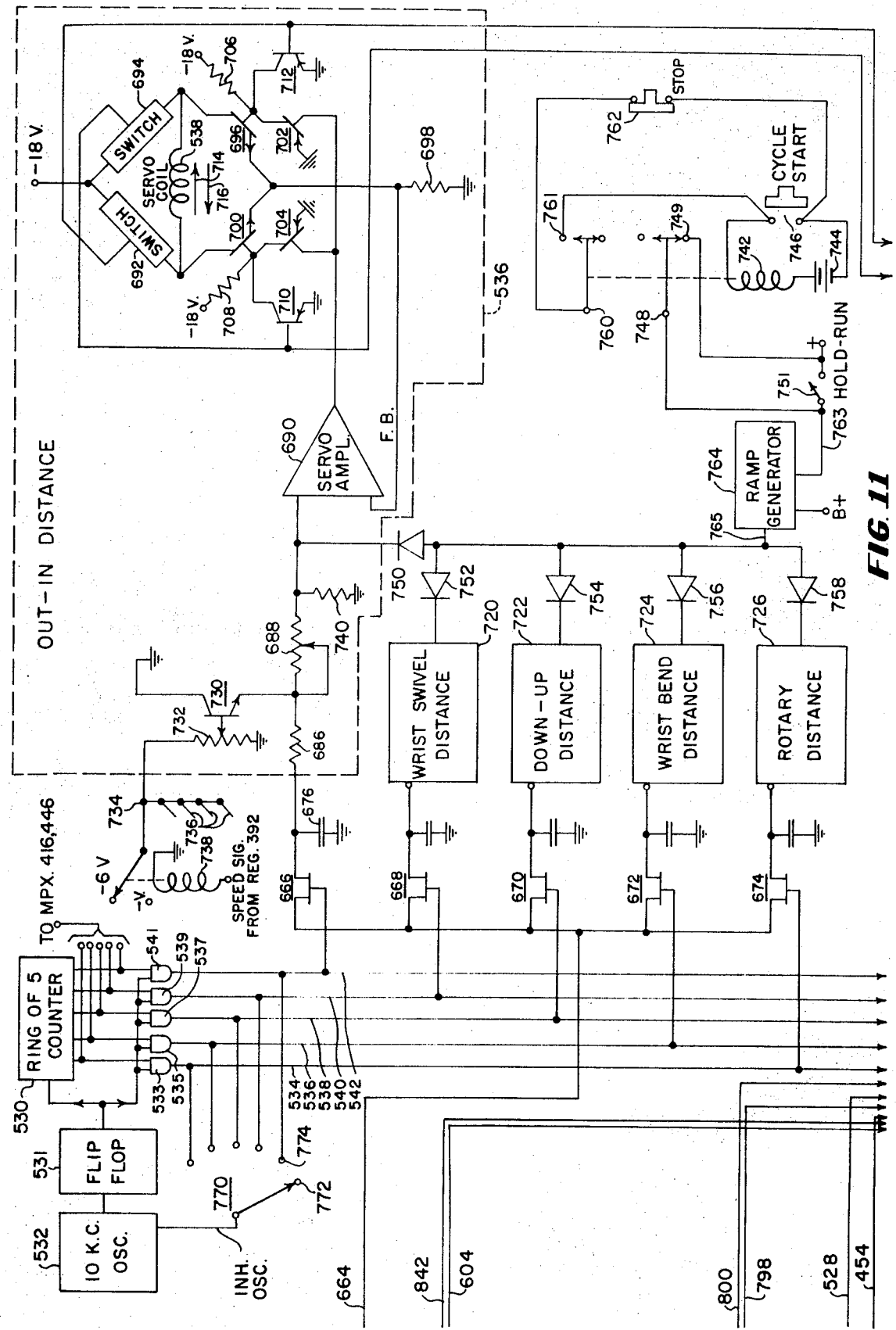

PROGRAMMED MANIPULATOR APPARATUS

This is a continuation application of application, Ser. No. 808,152 filed Mar. 18, 1969, now abandoned.

The present invention relates to manipulator apparatus, and, more particularly, to manipulator apparatus which may be programmed to perform a desired series of operations in succession during repetitive working cycles.

Various types of programmed manipulator apparatus have been developed heretofore. While these arrangements have, in general, been satisfactory for their intended purpose, they have nevertheless suffered from a number of disadvantages. Thus, up to the present time, the cost of programmed manipulator apparatus has been such as to limit the widespread usage of such devices. Furthermore, the prior art arrangements lack flexibility in maneuvering of the programmed manipulator arm. In addition, movement of the manipulator arm in the controlled axes has been relatively slow and, in many instances, involved abrupt accelerations and decelerations of the arm which produce excessive wear and shock on the apparatus. Furthermore, the time required to perform a given series of operations was quite large due to the fact that the manipulator arm had to be brought to a halt between each programmed step, or group of steps.

It is, therefore, a primary object of the present invention to provide a new and improved programmed manipulator apparatus which avoids one or more of the above-described disadvantages of prior art arrangements.

It is another object of the present invention to provide a new and improved programmed manipulator apparatus which may be manufactured on a mass production basis at low cost and with improved performance.

It is a further object of the present invention to provide a new and improved programmed manipulator apparatus wherein a low cost hydraulic system is incorporated to move the manipulator arm in all controlled axes.

It is another object of the present invention to provide a new and improved programmed manipulator apparatus wherein the manipulator arm may be moved at high velocity and without halting at programmed points so as to decrease substantially the time required to perform a given series of movements.

It is a further object of the present invention to provide a programmed manipulator apparatus in which the manipulator arm is controlled from point to point information while providing effectively continuous path movement of the manipulator arm.

It is a still further object of the present invention to provide a programmed manipulator apparatus which employs a simplified electronic control system in which a single comparator and digital analog converter is employed for all controlled axes of the apparatus.

It is another object of the present invention to provide a programmed manipulator apparatus wherein acceleration and deceleration of the manipulator arm in each controlled axis is accomplished at a maximum value without exceeding predetermined design limits of the apparatus.

Briefly considered, the programmed manipulator apparatus of the present invention employs a continuously rotating memory drum in which may be stored signals representing a number of steps in a desired sequence of operations. A portable teach control assembly is employed during the teaching operation to establish each desired position of the manipulator arm which is then recorded on the memory drum. During repeat operation, command signals derived from the drum are compared with accurately produced encoder signals and the manipulator arm is moved to each set of positions as called for on the drum. The manipulator arm may either be made to move to the programmed point exactly, or movement of the arm may be made on a continuous path basis, and over curved paths, by employing artificial coincidence signals which may be developed while large error signals still exist in the controlled axes. As a result, time required to perform a given series of operations is substantially increased.

A common comparator and digital to analog converter is employed to control all axes of the apparatus while providing coincidence signals representing different magnitudes of error signals. The output of the digital to analog converter is correlated with the apparatus used to move the manipulator arm in each axis so that maximum acceleration and deceleration can be produced without exceeding the design limits of the apparatus.

The invention, both as to its organization and method of operation, together with further objects and advantages thereof, will best be understood by reference to the following specification taken in connection with the accompanying drawings, in which.

Figure 1:
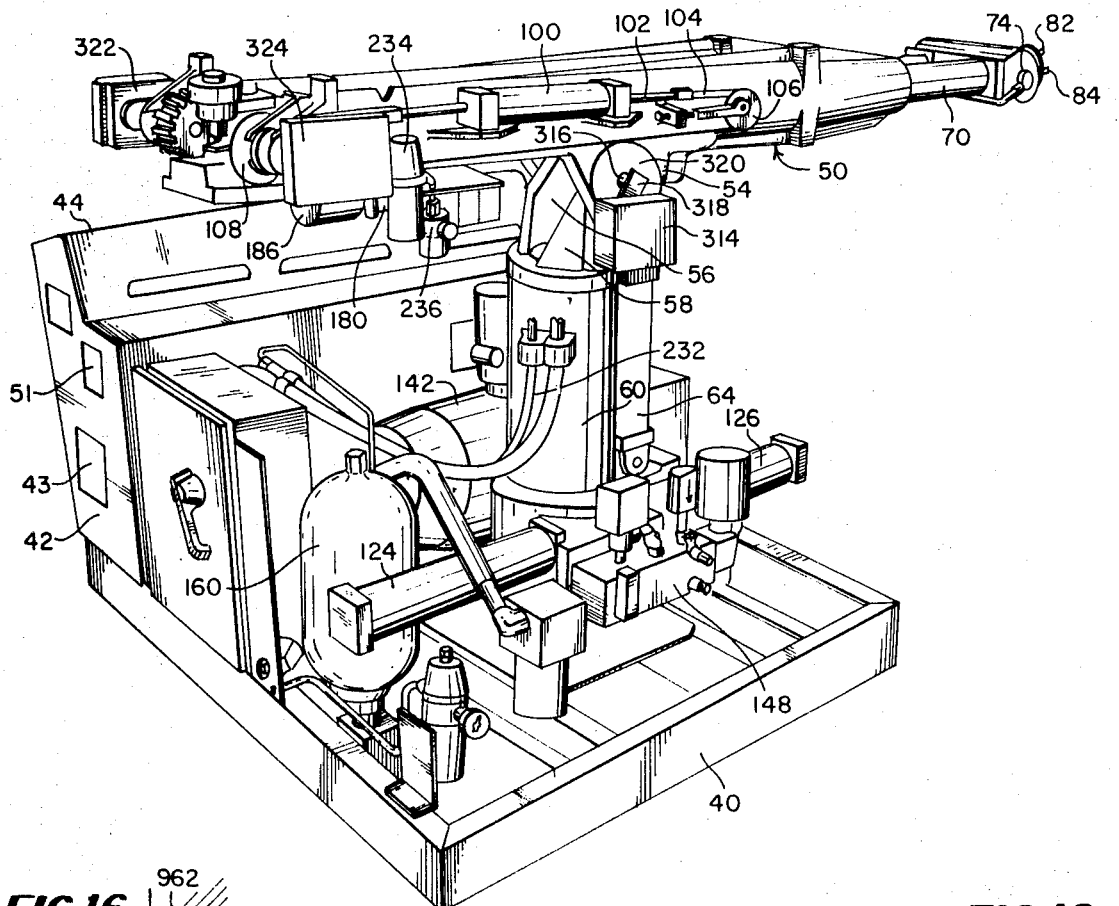
FIG. 1 is a perspective view of a programmed manipulator apparatus embodying the features of the present invention, taken from the right-hand side thereof.
Figure 16:
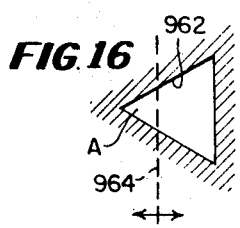
Figure 15:
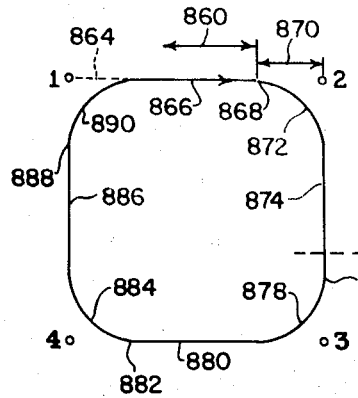
Figure 17:
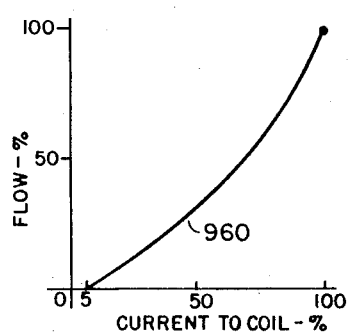
Figure 18:
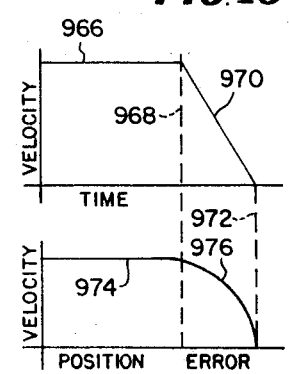
Figure 2:
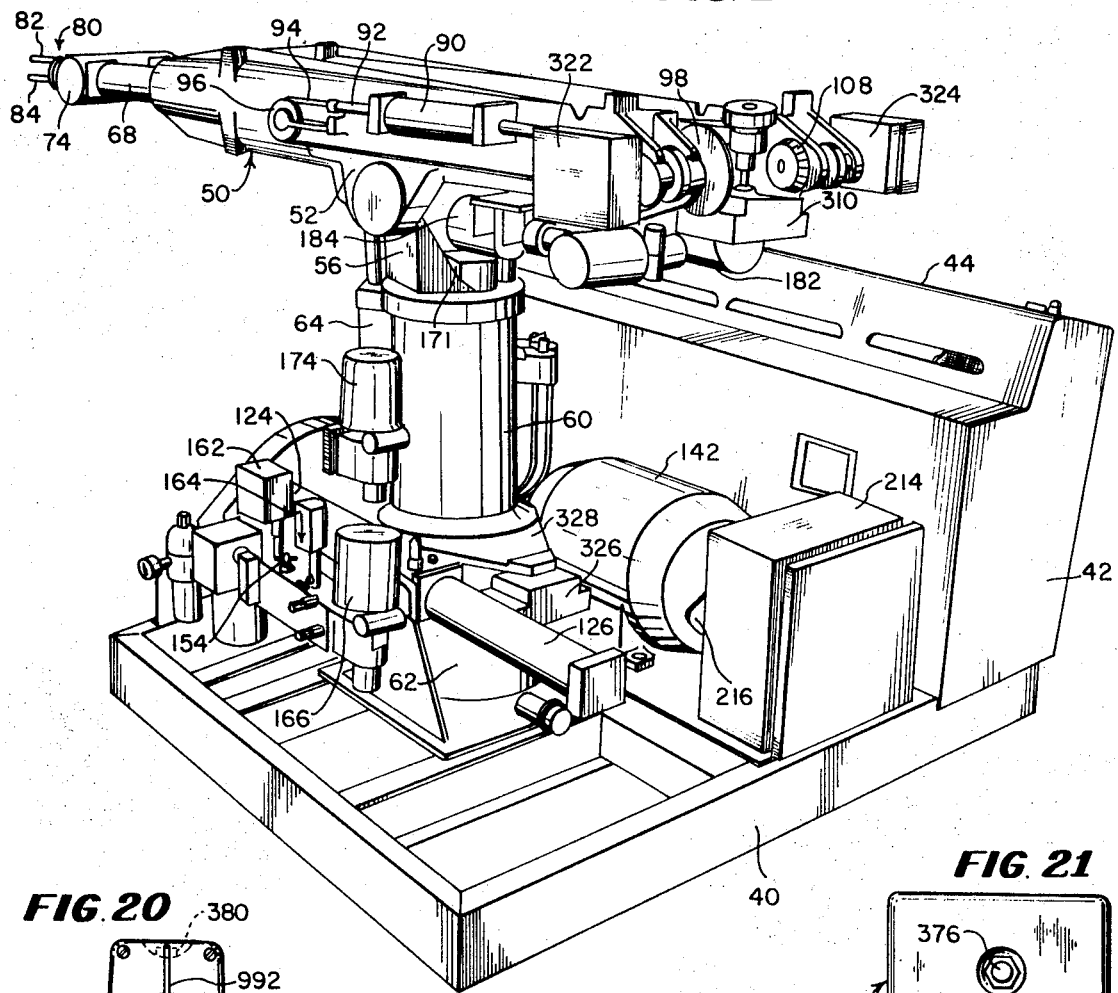
FIG. 2 is a perspective view of the apparatus of FIG. 1 but taken from the left-hand side thereof.
Figure 20:
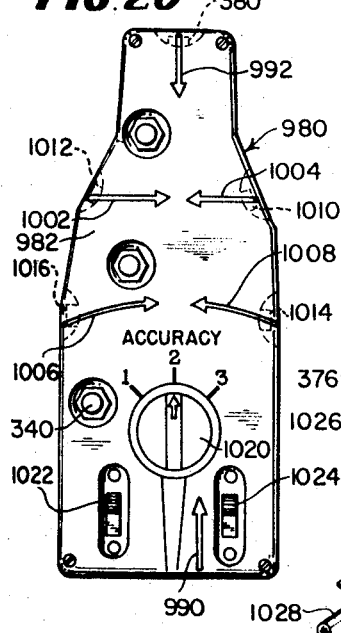
Figure 19:
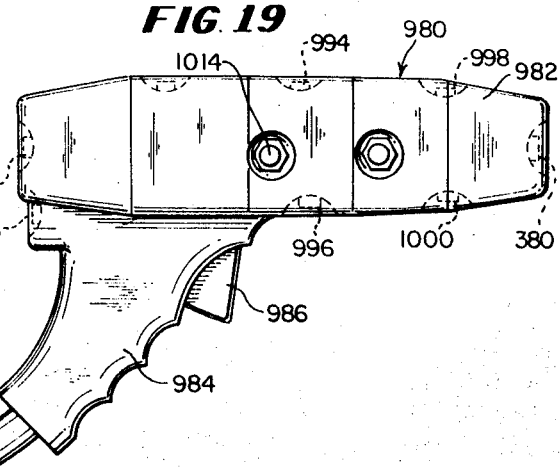
Figure 3:
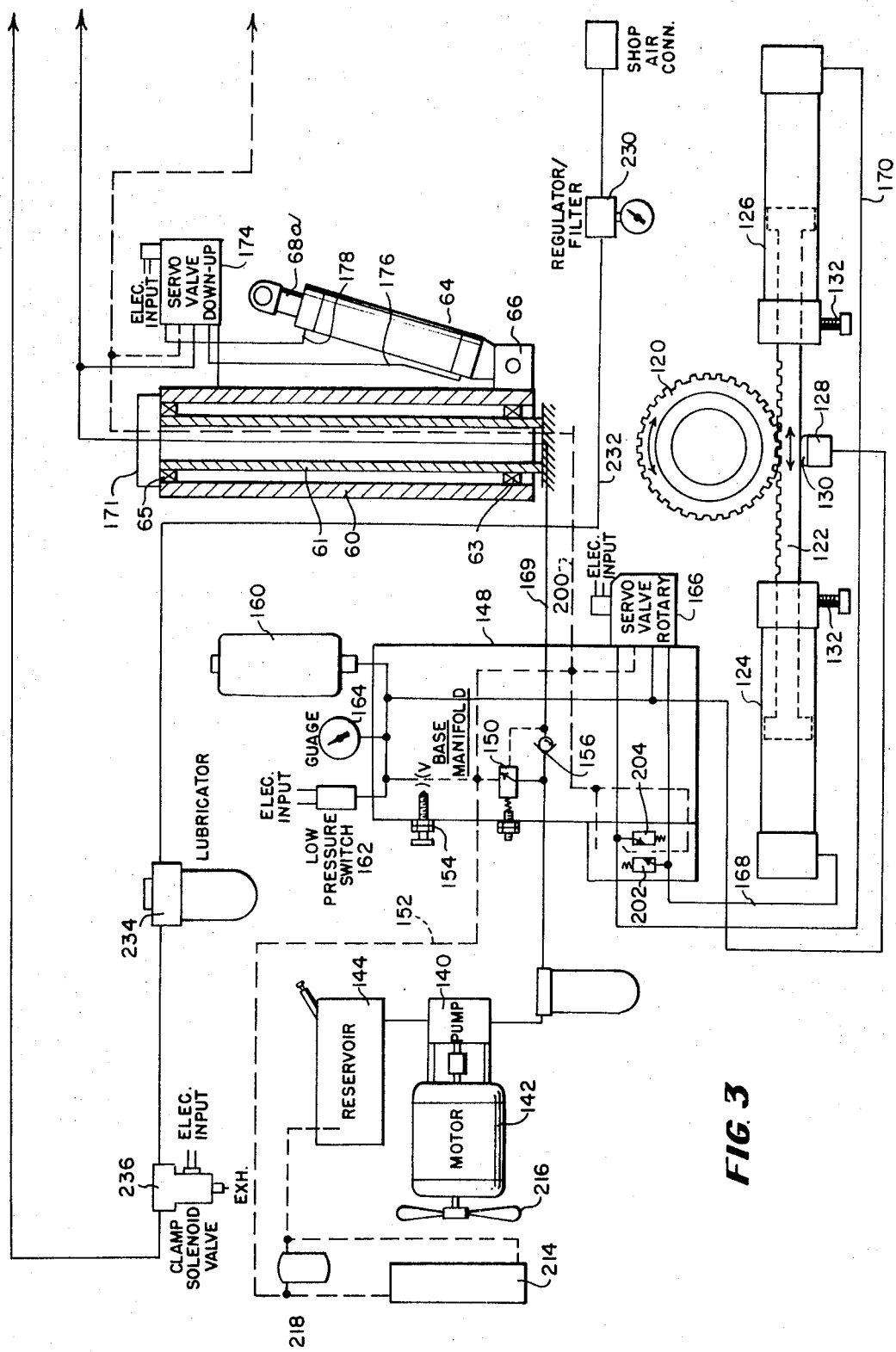
Figure 5:
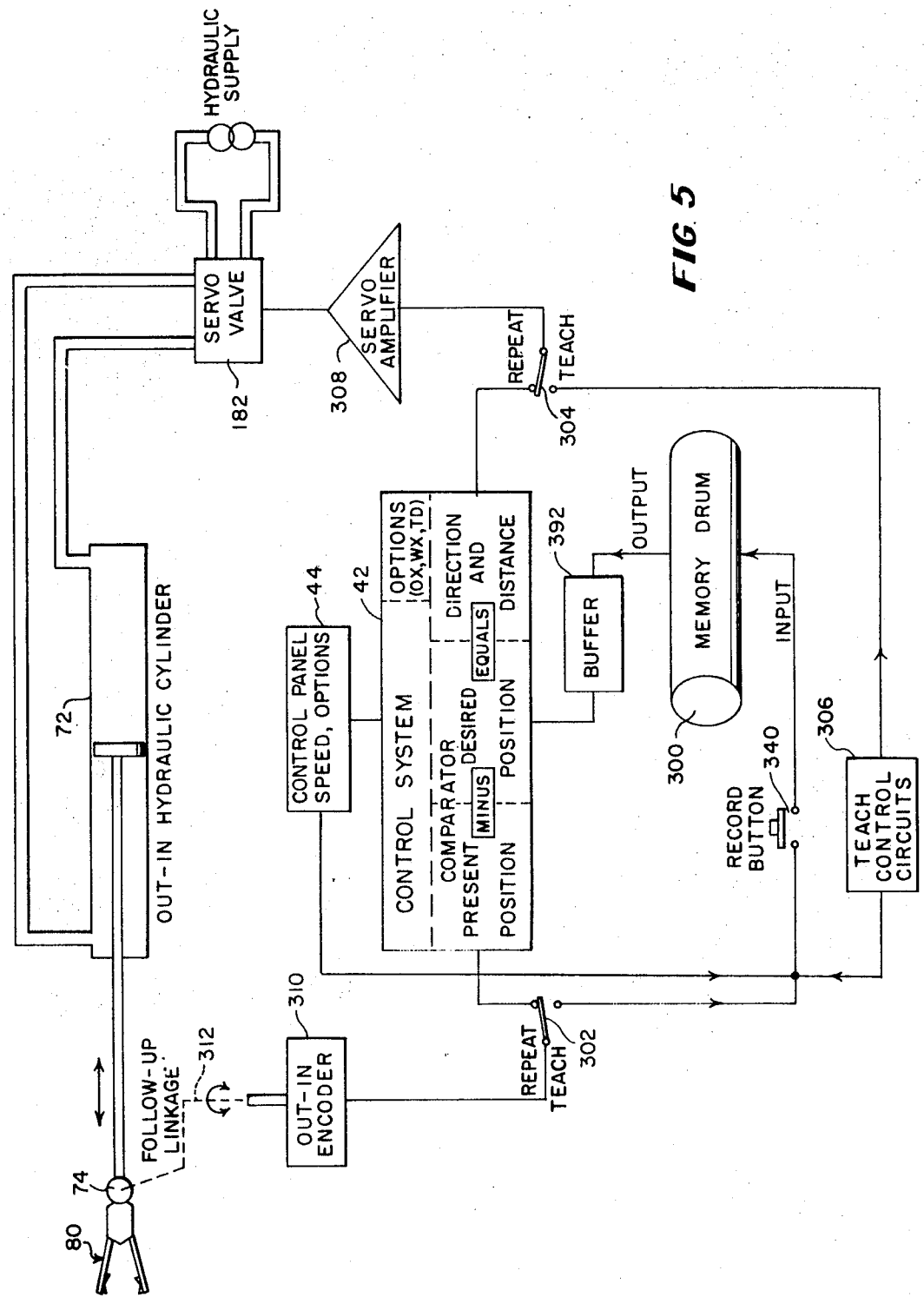
Figure 6:
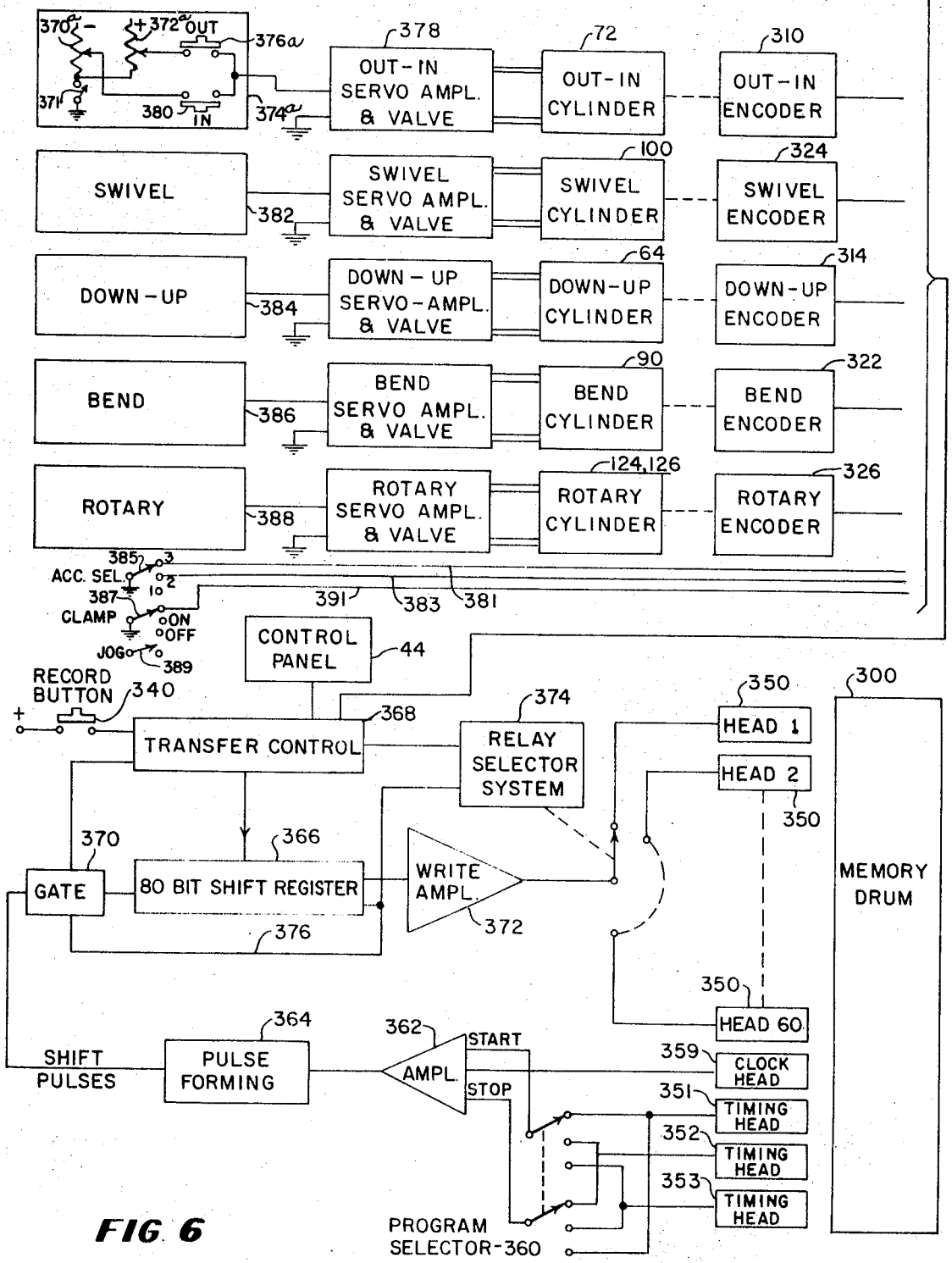
Figure 7:
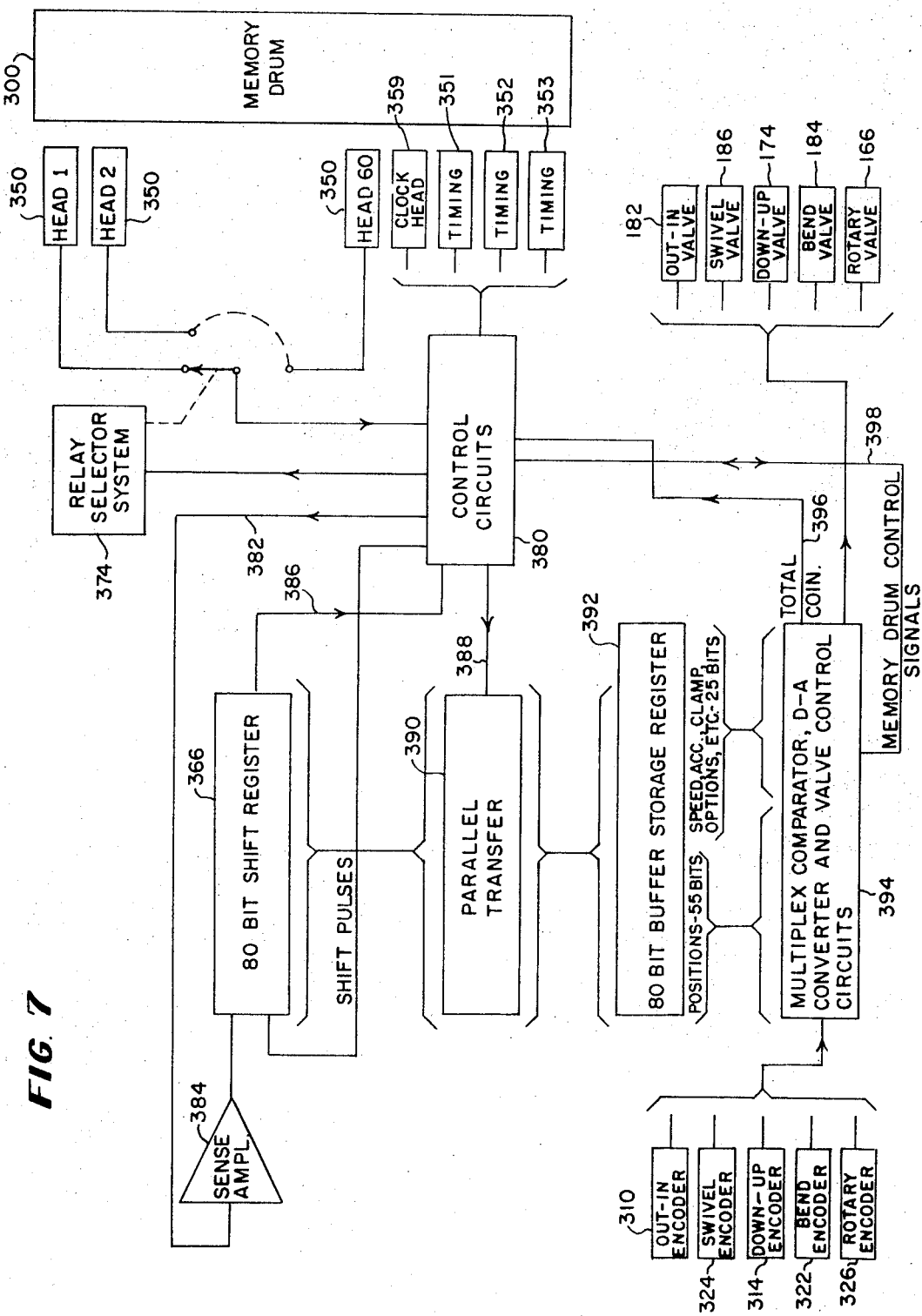
Figure 8:
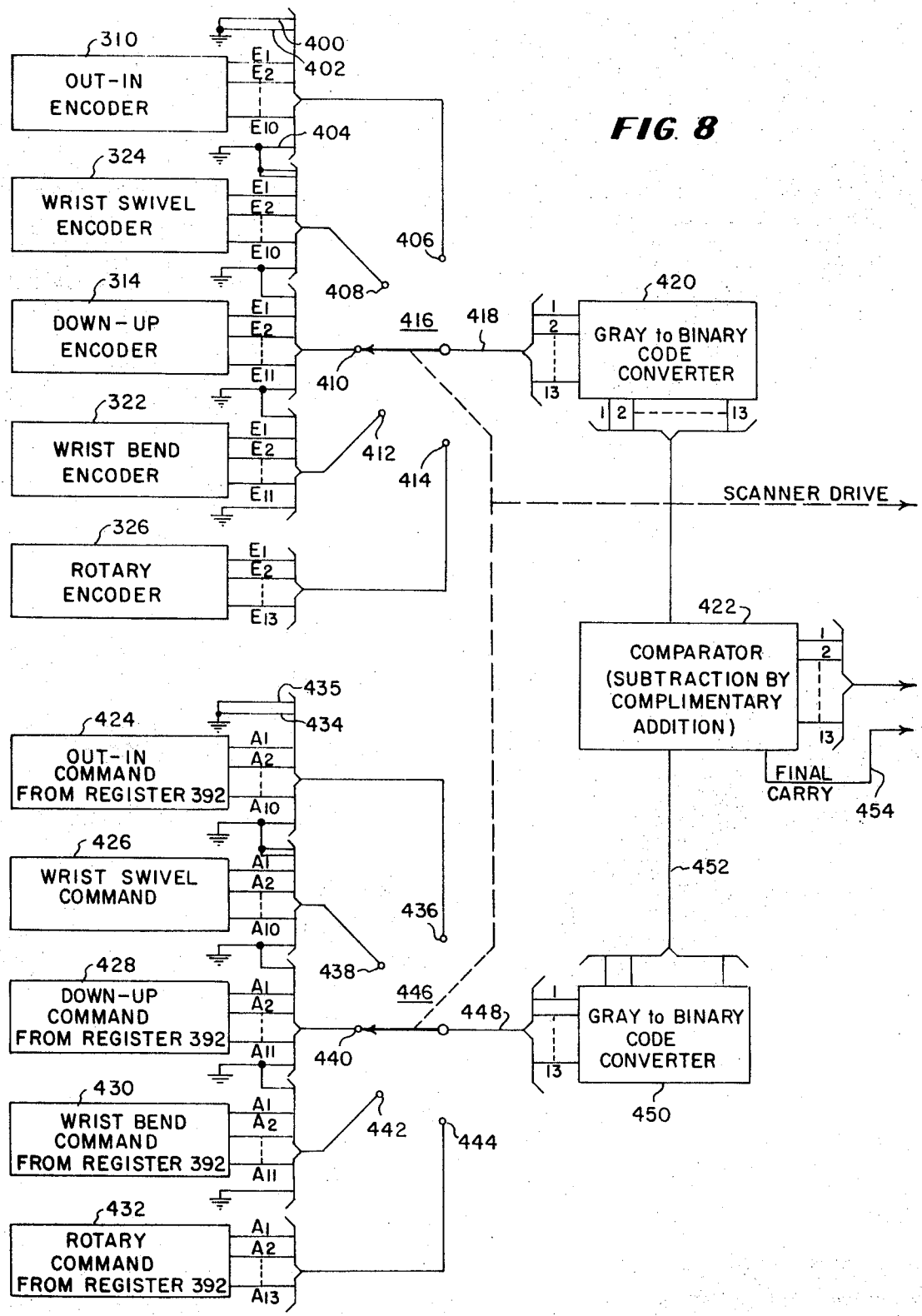
Figure 9:
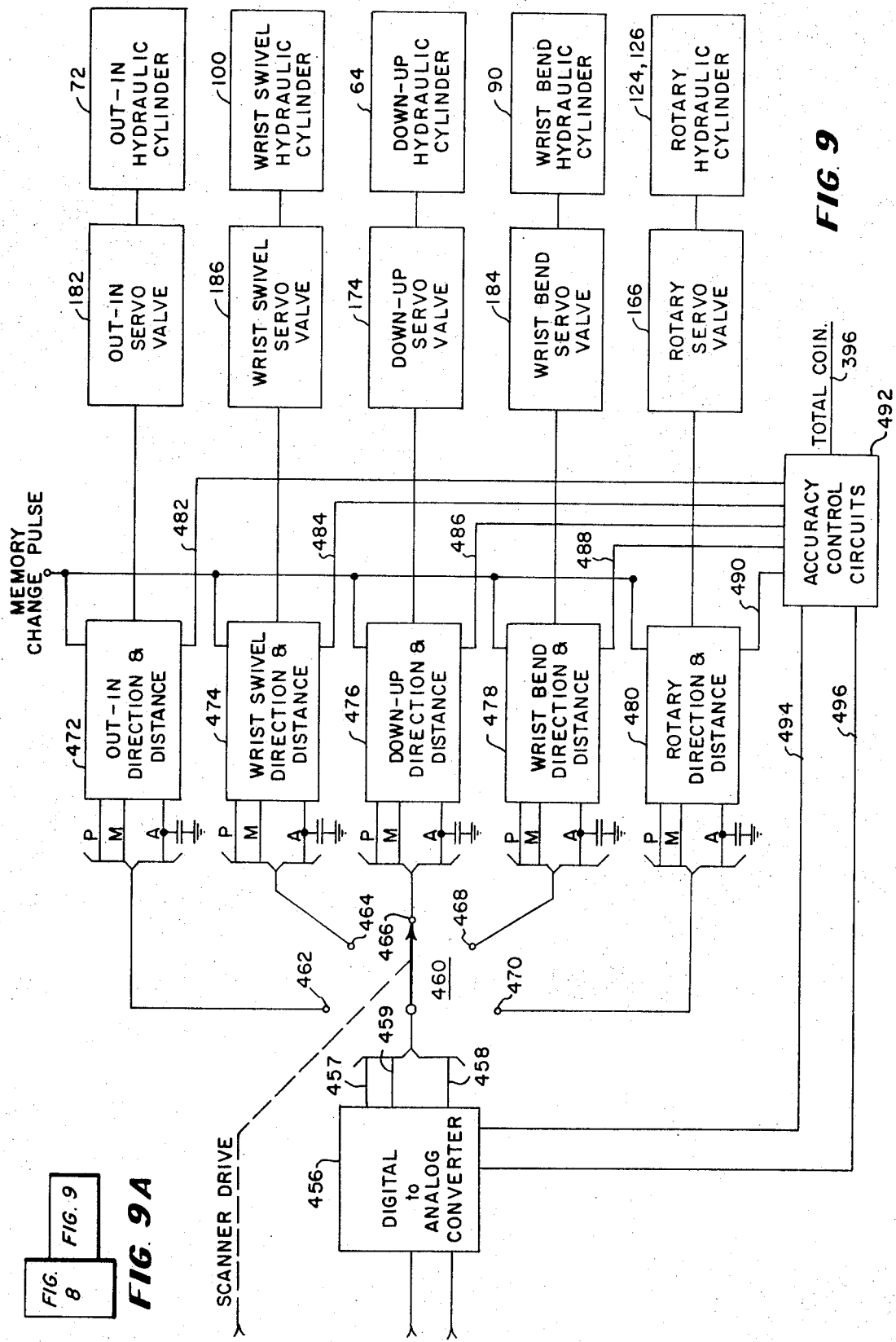
Figure 10:
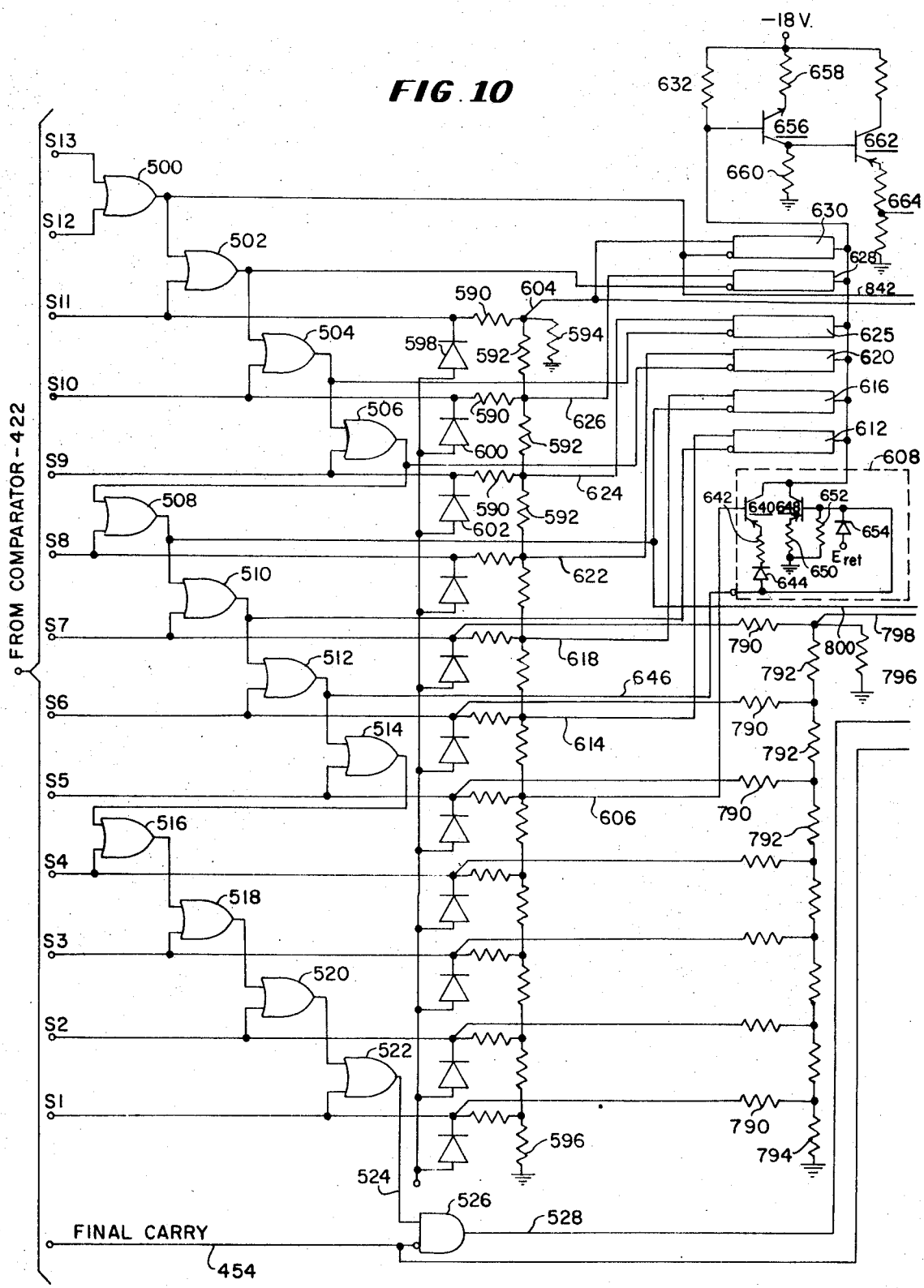
Figure 13:
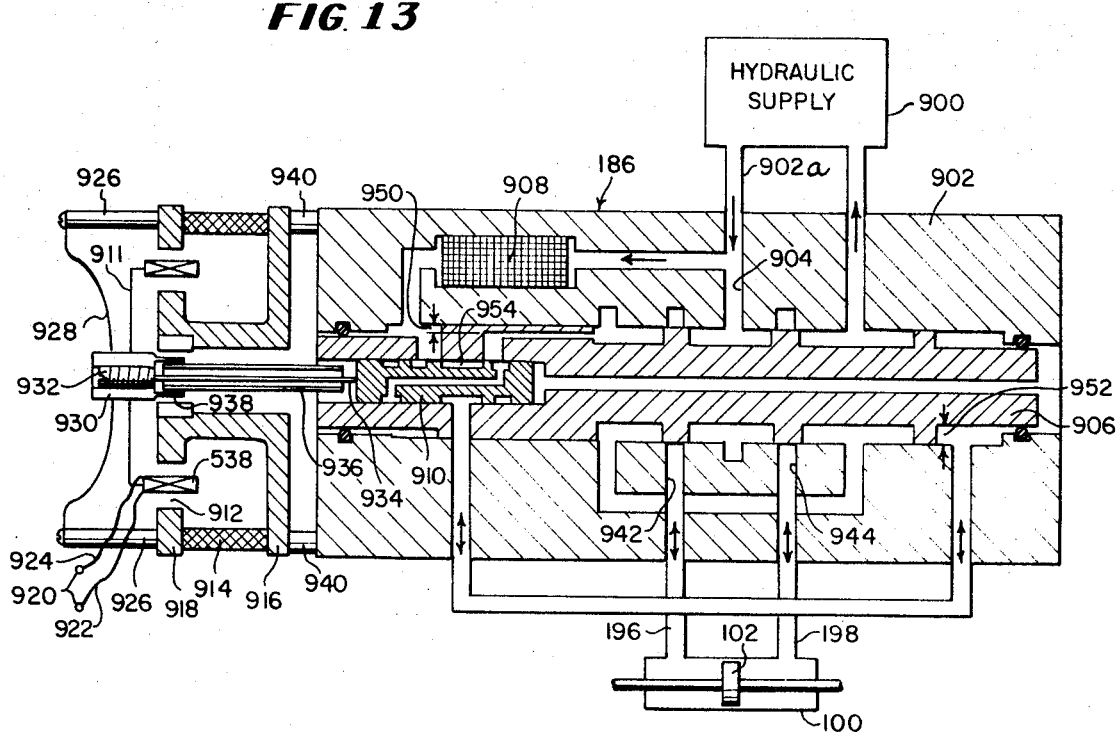
Figure 14:
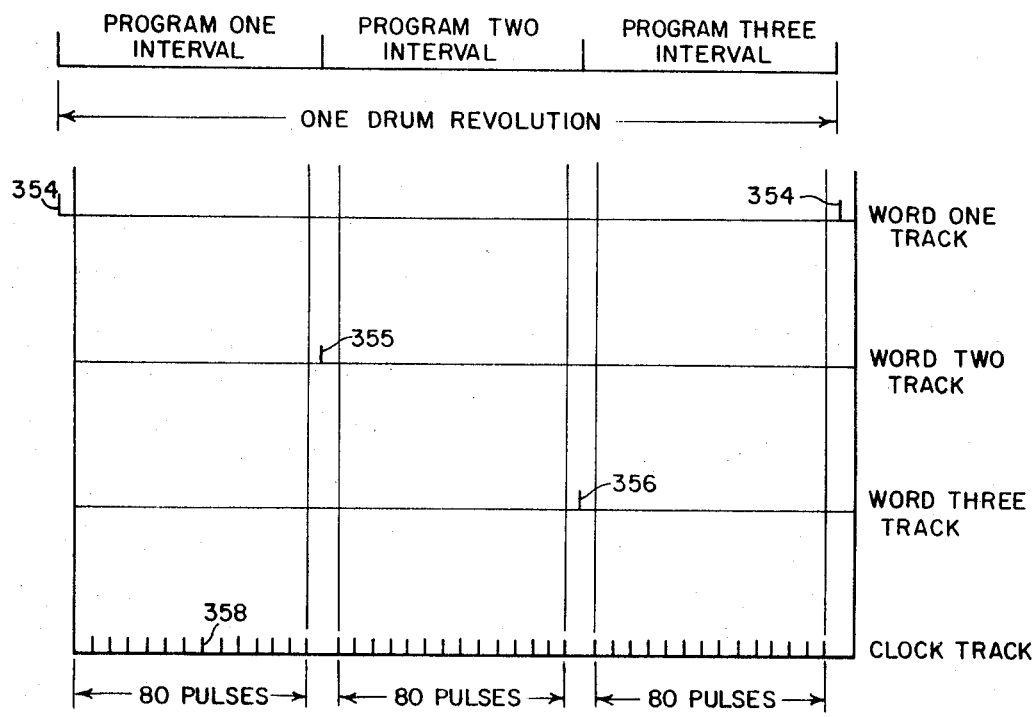
Figure 12:
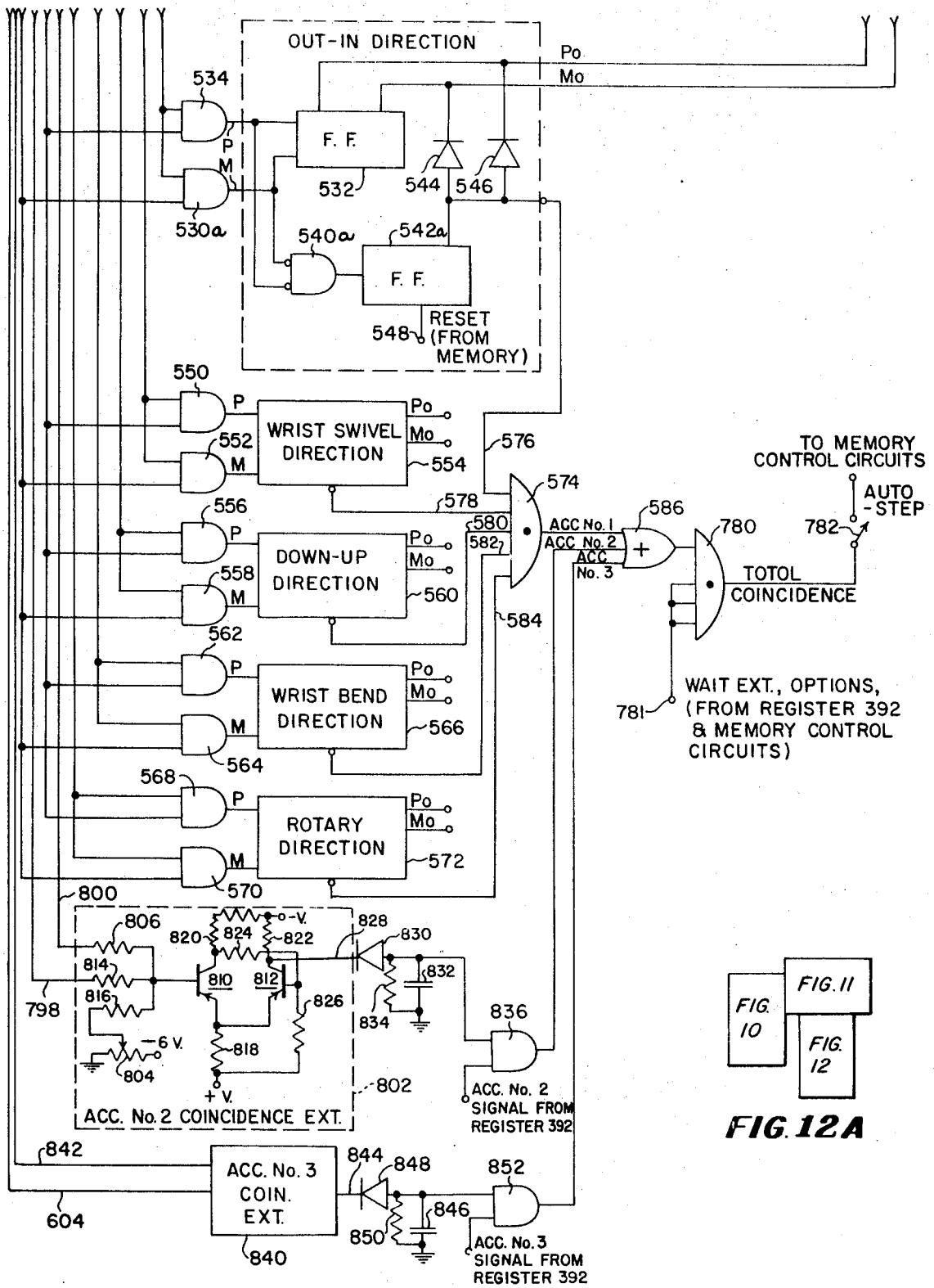

FIGS. 3 and 4, when assembled in the manner shown in FIG. 4A, constitute a schematic diagram of the hydraulic and pneumatic components of the apparatus of FIG. 1;

FIG. 5 is a basic block diagram of the electronic control portion of the apparatus of FIG. 1, illustrated in conjunction with a single controlled axis thereof;

FIG. 6 is a block diagram of the control system of the apparatus of FIG. 1 when operated in the teach mode and illustrating the manner in which information from all five axes of the apparatus are recorded on the memory drum during the teach mode;

FIG. 7 is a block diagram of the control system of the apparatus of FIG. 1 when operated in the repeat mode and shown in conjunction with all five axes of movement of the apparatus of FIG. 1;

FIGS. 8 and 9, when arranged in the manner shown in FIG. 9A, comprise a block diagram of the multiplex comparator system employed in the control system of the apparatus of FIG. 1;

FIGS. 10, 11 and 12, when arranged in the manner shown in FIG. 12A, comprise a schematic diagram of the digital to analog converter and certain control circuits of the control system of the apparatus of FIG. 1;

FIG. 13 is a sectional view of the servo valve arrangement employed to actuate each of the hydraulic cylinders in the manipulator apparatus of FIG. 1;

FIG. 14 is a timing diagram illustrating the manner in which different programs may be recorded on the memory drum portion of the control system of the apparatus of FIG 1;

FIG. 15 is a graph illustrating one mode of operation of the manipulator arm of the apparatus of FIG. 1;

FIG. 16 is a diagrammatic view of a preferred characteristic of the servo valve of FIG. 13;

FIG. 17 is a graph of the current-flow characteristic of the servo valve of FIG. 13;

FIG. 18 comprises two graphs useful in explaining the deceleration characteristic of the apparatus of FIG. 1;

FIG. 19 is a right-side view of a portable teach control assembly used in conjunction with the apparatus of FIG. 1 during the teaching mode;

FIG. 20 is a top view of the teach control assembly of FIG. 19; and

Figure 21:
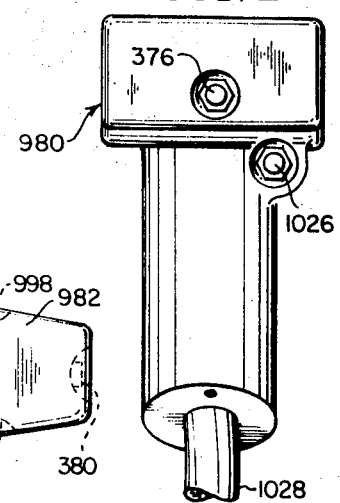

FIG. 21 is a front view of the teach control assembly of FIG. 19.

Referring now to the drawings, and more particularly to FIGS. 1 to 4, inclusive, thereof, the programmed manipulator apparatus of the present invention is therein illustrated as comprising a generally rectangular base or mounting platform 40 on which the hydraulically powered manipulator arm of the apparatus is supported together with all of the hydraulic, electrical and electronic components necessary to provide a five programmed articulations or degrees of freedom for the manipulator arm.

Specifically, the base 40 supports a control cabinet indicated generally at 42 within which is housed the electronic control system portion of the manipulator apparatus, said cabinet having a control panel 44 on which are located the various controls of the control system necessary to control movement of the hydraulically powered manipulator arm in both an initial so-called teaching mode and in a repeat mode in which the manipulator arm is moved in repetitive cycles through a sequence of movements in each of the five axes as programmed during the teaching operation.

The hydraulically powered manipulator arm comprises a boom assembly indicated generally at 50, which is pivotally mounted for movement about a horizontal axis by means of a pair of ear portions 52 and 54 which are pivotally mounted on the outboard side of a pair of upstanding opposed ear portions 56 and 58 of a hollow trunk portion 60 which is rotatably mounted on a hollow, fixed, vertically extending column 61 the bottom portion 62 of which is secured to the platform 40. The ear portions 52, 54 are mounted on stub axles 316 which project outwardly from the trunk ears 56, 58 so that the boom assembly is supported at points which are spaced relatively far apart so as to provide maximum resistance to torsional forces tending to twist the boom assembly 50 about its longitudinal axis.

The boom assembly 50 is tilted to give a down-up motion of the outer end of the manipulator arm by means of a down-up hydraulic cylinder 64 the bottom end of which is pivotally mounted in a block 66 secured to the bottom edge portion of the trunk 60, the movable plunger portion 68a of the cylinder 64 being pivotally secured to the boom assembly 50 forwardly of the trunk 60 so that movement of the piston 68a causes the boom assembly 50 to pivot about the pivotal axis of the ear portions 56 and 58. In order to prevent excessive error in positioning the manipulator arm in down-up axis, particularly when the boom 50 is extended and is carrying a heavy load, the trunk 60 is journaled in bearings 63 and 65 located at the bottom and top, respectively, of the fixed column 61. With this arrangement, the block 66 which mounts the lower end of the hydraulic cylinder 64 is located over the bearing 63 and side thrust developed by the cylinder 64 is transmitted directly to the fixed column 61 so that tilting of the trunk 60 about the vertical axis is avoided. As a result, the outer end of the boom assembly may be accurately positioned at full extension and maximum load.

The boom assembly 50 includes a pair of hollow extendable arm portions 68 and 70 which are arranged to be moved as a unit in and out of the corresponding portions of the boom assembly 50 by means of a hydraulic cylinder 72 which is positioned between the arm portions 68, 70 and provides a so-called "radial" extension or retraction of the manipulator arm. More particularly, the outer ends of the tubes 68, 70 are secured to a crosshead assembly 74 and the extendable long stroke piston 76 of the cylinder 72 is pivotally connected to the crosshead assembly 74 intermediate the arm portions 68, 70.

The crosshead assembly 74 carries a forwardly projecting hand portion 78 to which is connected a pneumatically operated clamping device indicated generally at 80, commonly called a hand assembly, which is provided with opposed grasping fingers 82, 84 arranged to support any desired object 86.

The hand assembly 80 is arranged to be moved in two different axes independently of movement of the boom assembly 50. More particularly, the member 78 is arranged to be rotated about the pivotal axis 88 of the crosshead assembly 74, this movement being referred to as wrist bend or simply bend.

In addition, the member 78 is arranged to be rotated about its longitudinal axis so as to produce a rotation of the hand assembly 80 about the central longitudinal axis of the boom assembly 50, this motion being referred to as wrist swivel or simply swivel.

In order to produce bending motion of the hand assembly 80, there is provided a hydrualic cylinder 90 which is mounted along the left-hand side of the boom assembly 50 and is provided with a double ended piston-type plunger 92. The ends of the plunger 92 are interconnected through a roller chain 94 which extends over a pair of sprockets 96, so that linear movement of the double ended plunger 92 is translated into rotational movement of beveled gears 98 which in turn cause rotation of a torque tube which contains a ball-nut in the outer end thereof near the forward end of the boom assembly 50. This ball-nut is slidably engaged with a spline shaft carried within the arm portion 68 which is free to move into and out of the torque tube as the arm portion 68 is extended and retracted. Rotation of this spline shaft is then transferred by means of bevel gears in the crosshead assembly 74 into a bend motion of the member 78 about the axis 88.

In a similar manner a hydraulic cylinder 100 is mounted on the right-hand side of the boom assembly 50 and is provided with a double-ended piston plunger 102, the ends of which are interconnected by means of a roller chain 104 extending around sprockets 106 also mounted on the right-hand side of boom assembly 50. Rotation of the rear sprocket 106 causes rotation of beveled gears 108 which in turn produce rotation of a second torque tube having a similar ball-nut at the forward end thereof so that a spline shaft which is slidably engaged with the ball-nut is rotated in response to motion of the swivel plunger 102. Rotation of this spline shaft is then translated by means of beveled gears in the crosshead assembly 74 into rotary motion of the member 78 so as to produce the desired wrist swivel action of the hand assembly 80.

The fifth degree of freedom comprises a rotary motion of the entire boom assembly 50 about the vertical axis of the trunk 60. In order to provide a positive drive for the trunk 60 so that the boom assembly 50 may be accurately positioned in rotary motion and may be rapidly decelerated to the desired end point, a ring gear 120 is mounted on the bottom end of the trunk 60 and engages a rack 122 the ends of which are arranged to be connected to the plungers of a left-hand hydraulic cylinder 124 and a right-hand hydraulic cylinder 126.

Accurate positioning of the boom assembly 50 in rotary movement is assured by means of a backlash control cylinder 128 which is provided with a piston having an end button 130 which protrudes from the cylinder and slidably engages the back side of the steel rack 122. System hydraulic pressure is supplied to the cylinder 128 so that the button 130 urges the rack 122 into engagement with the ring gear 120 with a force which is somewhat greater than the maximum separating forces experienced under maximum acceleration or deceleration conditions of the boom assembly 50. The hydraulic cylinders 124 and 126 are mechanically adjusted by means of the screws 132 so that the housings thereof are centered about the line of motion of the rack 122 and the plungers of the respective cylinders. In order to reduce wear on the backlash piston button 130, this button is preferably made of bronze filled teflon. This material has been found to have superior wear characteristics over either an all bronze piston which would have high friction and would wear out quickly or a pure teflon button which would have a tendency to cold flow under the pressure exerted by the cylinder 128.

Hydraulic power for the operation of the above described hydraulic cylinders is provided by a completely self-contained hydraulic system mounted on the base platform 40. Basic hydraulic power is generated by a gear-type pump 140 which is driven by an electric motor 142. Hydraulic fluid, at atmospheric pressure, flows from a reservoir 144 to the inlet of the pump 140. The output of the pump 140 flows through a ten micron filter 146 to a base manifold 148 which is mounted on the platform 40. An unloading valve 150 in the base manifold 148 acts automatically to maintain an average system pressure of approximately 850 p.s.i. Under low flow demand, the output of the pump 140 is returned to the reservoir 144 directly over the hydraulic return line 152. Under high flow demand, pump output is directed to the system hydraulic cylinders. A dump valve 154 is provided in the base manifold 148 which can be used to reduce system pressure to zero. A check valve 156 is provided at the output of the unloading valve 150 to prevent reverse flow of fluid when the pump 140 is operating under low flow demand or when it is not operating at all.

The output of the unloading valve 150 is directed to an accumulator 160, a pressure switch 162, a pressure gauge 164, and the five servo valves which are employed to control the above-described hydraulic cylinders which move the arm and hand assembly in the desired five degrees of movement, these servo valves being individually controlled by electrical signals developed in the control system portion of the manipulator apparatus, as will be described in more detail hereinafter. Specifically, a rotary servo valve 166 is mounted on the platform 40 and is arranged to supply controlled hydraulic fluid to the cylinder 124 over the conduit 168 and to the cylinder 126 over the conduit 170. Hydraulic fluid at system pressure is also supplied over the conduit 169 through the hollow trunk column support 61 to a trunk through-feed assembly which provides a path for the flow of pressure and return fluid from the stationary base assembly to the rotating boom assembly 50. The through feed assembly comprises a stationary tube within a concentric passage in a trunk feed-through manifold 171 which moves with the boom 50. Fluid at system pressure is directed to the tube of the through feed assembly, through the manifold 171 at the top of the trunk 60 and from there directly to the forward end of the out-in cylinder 72 over a conduit 172. System pressure is also supplied to the pressure port of a down-up servo valve 174 which is mounted on and rotatable with the trunk 60, the down-up servo valve 174 being arranged to supply controlled pressure to either end of the hydraulic cylinder 64 over the conduits 176 and 178. The feed-through manifold 171 also supplies system pressure to a boom manifold 180 which is mounted on and is rotatable with the boom assembly 50. The boom manifold directs fluid at system pressure to the pressure port of an out-in servo valve 182 which is mounted on the rear end of the boom assembly 50, a bend servo valve 184 which is mounted on the left-hand side of the boom assembly 50 beneath the bend cylinder 90, and a swivel servo valve 186 which is mounted on the right-hand side of the boom assembly 50.

The out-in servo valve 182 supplies controlled pressure over the conduit 190 to the rear end of the out-in hydraulic cylinder 72, and fluid at system pressure is admitted to the rod side of the piston 76 over the conduit 172 at all times. The differential piston area thus provided in the cylinder 72 permits cylinder operation over a long stroke and at a reduced net flow requirement. Accordingly, as the piston 76 is moved forwardly fluid is returned over the conduit 172 to the servo valve 182 and recirculates to the piston side of the cylinder. However, the area of the rod side of the piston is made equal to one-half the area of the piston and the volume of flow into the conduit 172 is one-half that of the controlled flow from the valve 182. As a result, the force which is available from the cylinder 72 is lower than system pressure but approximately equal velocity of the piston 76 in both directions is thereby provided.

The bend servo valve 184 supplies controlled pressure to the hydraulic cylinder 90 over the conduits 192 and 194 and the swivel servo valve supplies controlled pressure to the cylinder 100 over the conduits 196 and 198. The servo valves 166, 174, 184 and 186 each act to direct fluid under pressure to one side of the hydraulic cylinder and open the opposite side of the cylinder for return flow over the indicated return conduit 200. With regard to the rotation cylinders, fluid is admitted and returned from the piston side of each actuator so that the two pistons of the cylinders 124 and 126 and the rack 122 act as a single piston in a single cylinder.

A pair of relief valves 202 and 204 are connected across the output of the rotary servo valve 166 and act to direct excessive pressure to the return line 200 so as to improve the deceleration characteristics of the boom assembly 50 in rotary motion and to eliminate shock loads on the rack 122 and ring gear 120. The relief valves 202 and 204 are arranged to be mounted as cartridge inserts in the side of the manifold 148 for easy servicing and replacement. A pair of relief valves 206 and 208 are also connected across the output of the bend servo valve 194 and a pair of relief valves 210 and 212 are connected across the output of the swivel servo valve 186 to provide protection for the respective bend and swivel drive trains in case the hand assembly 80 strikes an obstacle or is overloaded. The relief valves 206, 208 and 210, 212 are likewise mounted as cartridge units on the side of the boom manifold 180.

Return lines for the down-up servo valve 174 and boom manifold 180 carry return fluid to the trunk feed through manifold 171 and thence to the return passage within the column 61. This return fluid flows to the base manifold 148, over the return conduit 152 and through a heat exchanger 214 to the reservoir 144. A heat exchanger fan 216 is driven directly by the motor 142 and a 5-micron filter 218 is connected across the heat exchanger to provide additional fluid filtering. Flow through the filter 218 is based on pressure drop across the heat exchanger and is, therefore, only partial flow.

The accumulator 160 is charged with dry nitrogen to 575 p.s.i. and assures that system pressure will be maintained when flow demands exceed the output flow capacity of the pump 140. The normally open contacts of the pressure switch 162 are closed whenever system pressure is above 300 p.s.i. The contacts of the switch 162 are connected into the control circuit for the motor 142 and are arranged to turn off the manipulator apparatus whenever system pressure drops below 300 p.s.i.

Compressed air for operation of the hand clamp is supplied through a regulator 230, a flexible hose 232 to the boom assembly 50, and through an in-line lubricator 234 to the pressure port of a three-way solenoid valve 236. The lubricator 234 introduces a measured amount of oil according to air flow for lubrication of the working parts of the air system. The controlled port of the solenoid valve 236 supplies controlled air through a telescoping air line 238 and a swivel fitting 240 to the hand air cylinder while permitting boom and hand motions. When the solenoid 236 is de-energized, pressure air is connected to the hand cylinder causing the fingers 82, 84 to close. When the solenoid 236 is energized the solenoid pressure port is closed, the hand cylinder is connected to exhaust and the hand is spring urged to an open position.

Each of the servo valves 166, 174, 182, 184 and 186 is a four-way, infinite-position valve which is responsive to both the polarity and amplitude of a direct current signal developed in the control system portion of the apparatus. Direction of motion of the pilot spool in each servo valve is determined by the polarity of the incoming electrical signal and the magnitude of this signal determines how far the valve will open and therefore how fast the controlled hydraulic actuator will move. Preferably, these servo valves are actuated by a long stroke electromagnetic actuator mechanism which is positioned in line with the pilot spool of the servo valve to provide fast response of the servo valve and its associated hydraulic cylinder to the incoming electrical signal on a hydraulic feedback basis and without requiring mechanical linkages for feedback to the input, as will be described in more detail hereinafter.

Considering now the control system portion of the manipulator apparatus, reference is made to FIG. 5 wherein the basic components of the control system are shown in block diagram form in conjunction with one controlled axis, the out-in axis, of the manipulator apparatus. The control system includes a continuously rotating memory drum 300 in which digital information may be stored relative to three different programs each consisting of a number of program steps up to a maximum of 60 steps in each program. The control system of the manipulator apparatus has two basic modes of operation. The first mode is a so-called teach mode in which the hydraulically powered manipulator arm is moved to the series of successive positions to which the arm is to be successively moved during repetitive working or repeat cycles. Each time that the manipulator arm is moved to a new position this position is recorded on the memory drum 300, together with associated auxiliary signals relating to how that particular program step is to be carried out. To this end, a pair of teach-repeat switches 302, 304 are provided. When the switches 302, 304 are thrown to the teach position, the teach control circuits 306 are connected to the input of the servo amplifier 308 which controls the out-in servo valve 182.

The teach control circuits 306 include suitable voltage sources for moving the manipulator arm in all five axes, as well as controls relative to the accuracy with which the arm is to be moved to the desired position, the operation of the hand clamp air cylinder, and other functions, as will be described in more detail hereinafter. The signal supplied to the out-in servo amplifier 308 opens the valve 182 by an amount determined by the amplitude of this signal so that the hydraulic cylinder 72 moves the hand assembly in the desired direction along the out-in axis. For purposes of illustration, the servo valve 182 is shown in FIG. 5 as having bi-directional outputs to the out-in hydraulic cylinder 72. However, it will be understood that with reference to the particular cylinder 72, the rod side of the cylinder is supplied with system pressure rather than through the servo valve 182, as has been described in more detail heretofore. The resulting pressure on the piston of the cylinder 72 moves the hand assembly 80 in or out, depending upon the polarity of the electrical signal developed by the teach control circuit 306.

In order to provide digital information representing the absolute position of the arm and hand assembly in each of the five controlled axes of movement thereof, there is provided a series of digital encoders, one for each controlled axis. More particularly, an out-in encoder 310 is mounted at the rear end of the boom assembly 50, behind the hydraulic cylinder 72 and is mechanically interconnected with the crosshead assembly 74 by means of a follow up linkage 312 so that as the hand assembly 80 is moved along the radial or out-in axis a digital signal is developed by the encoder 310 which represents the absolute position of the hand assembly in this axis in digital form. In a similar manner a digital down-up encoder 314 is provided to develop an absolute position signal which changes in a digital manner in response to tilting of the boom assembly 50 about the fixed axle 316 on which the ear portion 54 is rotatably mounted. The encoder 314 is mounted on the end of the axle 316 through an intermediate member 318 and is driven from a large spur gear 320 which is mounted on the ear portion 54 of the boom assembly 50 and moves therewith. Accordingly, as the boom 50 is tilted about the axle 316 the gear 320 rotates and through an intermediate gear drives the encoder 314 so that the desired absolute position signal is obtained in the output thereof.

A bend encoder 322 is mounted on the left-hand side of the boom assembly and is driven from the gearing 98 associated with the hydraulic cylinder 90 so as to develop a digital output signal corresponding to the position of the cylinder 90 and hence the position of the hand assembly 80 in the wrist bend axis. A wrist swivel encoder 324 is mounted on the right-hand side of the boom assembly 50 and is mechanically interconnected with the gearing associated with the hydraulic cylinder 100 so as to provide a digital output signal corresponding to movement in the wrist bend axis. A rotary encoder 326 is mounted on a stationary bracket portion 328 of the base assembly 62 and is interconnected with the rotatable trunk assembly 60 through a chain and sprocket drive so that a digital output signal is developed by the encoder 326 representing the absolute position of the boom assembly 50 in rotary movement of the trunk 60 about a vertical axis.

Each of the encoders 310, 314, 322, 324 and 326 is preferably of the type shown in a copending application of George Hamlin Leonard Ser. No. 494,524, filed Oct. 11, 1965, in order to provide a high degree of accuracy of the digital information developed by the encoder while at the same time providing for relatively long distances of travel in each of the five controlled axes. While reference may be had to said copending Leonard application for a complete and detailed description of such encoders, it may be stated generally that such an encoder comprises a pair of code-bearing discs which are geared together so as to advance continuously at different ratios in accordance with the mechanical input signal. The successive code combinations of the two discs are continuously sensed, each code member contributing its part to a composite code combination. The high speed code member rotates one revolution in the course of a single code-combination advance of the low speed code member. An arrangement is provided for insuring accurate transfer of information from one bit to the next on the low speed disc during a change in the high speed code member from one code bit at the completion of one code cycle to the next code bit at the start of the next code cycle. By employing combinational codes derived from both high speed and low speed discs, large digital numbers and hence large distances of movement in each axis may be measured by the encoders, while providing high accuracy digitized output signals. The encoder for a particular axis will develop a digital signal having a number of digits corresponding to the movement which is to be made in that axis and the degree of accuracy required therein. For example, the encoder 310 may develop a 10-bit digital signal, the encoder 324 may also develop a ten bit signal, the encoders 314 and 322 may develop 11-bit digital signals, and the rotary encoders 326 may develop a 13-bit digital signal. Such encoders have been found suitable for movement of the manipulator arm a distance of 42 inches in the out-in direction, a wrist swivel travel of 320°, a down-up movement corresponding to a tilt to the boom assembly from 27° below horizontal to 30° above horizontal, a wrist bend traverse of 220° centered about a horizontal axis, and a rotary movement of the trunk 60 of 220°.

Referring again to the teach mode of operation of the control system, when the hand assembly 80 has been moved to the desired position, the encoder 310 continues to develop a digital output signal representing this final position of the hand assembly in the out-in axis. The manipulator arm and hand assembly is also positioned in the other four axes of movement so that the hand assembly is in a desired final position and orientation to which it is to be moved during a repeat cycle. The digital signals which are continuously produced by the encoders associated with each axis are supplied through the switch 302 to one side of a normally open record button 340. In addition, certain other signals are supplied to the record button 340 from the teach control circuits 306, and also from the control system as set up on the control panel 44, which indicate other functions which are to be performed in conjunction with movement of the manipulator arm to the desired position. The record button 340 is then depressed and supplies all of these signals to the memory drum 300, so that the information represented thereby is recorded on the memory drum 300 at a desired position corresponding to the particular program step which is being taught. Preferably, the digital signals which are developed by the encoders such as the encoder 310, are in reflected binary code, as distinguished from standard binary code, for the reason that the reflected binary signal is one in which only one digit changes between successive numbers in the code.

After the record button 340 is released the teach control circuits 306 are actuated so as to move the hand assembly 80 to a new position by energization of those ones of the hydraulic cylinders in each axis which must be changed from the previously programmed position. When the next position is reached, the record button is again depressed so as to record the new digital information for each axis at the new program step area of the memory drum 300. This sequence of operations is carried out until the manipulator arm has been moved to the last desired position at which point an end of program bit is recorded in the memory drum 300 along with information relating to the last program step.

After a complete program consisting of a number of positions to which the manipulator hadn is to be moved in succession has been recorded in the memory drum 300, the repeat teach switches 302 and 304 are thrown to the repeat position.

In this position the output of the encoders, such as the encoder 310, are supplied to a comparator portion of the control system and the desired position in each axis is sensed from the memory drum 300 and stored in a buffer storage unit 392. The comparator compares, in each axis, the encoder signal with the memory drum command signal and derives both a direction signal signifying the direction in which the hand should be moved to reduce the error, and a distance signal corresponding to the difference between the encoder signal representing the actual position of the hand assembly 80 and the desired position as stored in the memory drum. In the illustrated out-in axis, these signals are supplied by way of the switch 304 to the servo amplifier 308 which controls the servo valve 182 so that the cylinder 72 moves the hand assembly in the correct direction to reduce the error signal to zero or to some programmed magnitude of error signal. When final coincidence is obtained in all axes of the apparatus, the next programmed step is read from the memory drum 300, is compared with the various encoders in each axis and the corresponding error signals are employed to drive the corresponding hydraulic cylinders to the next programmed point in each axis. When the manipulator arm is moved to the last programmed position the end of program bit is employed to restart the programmed series of operations so that the manipulator arm repetitively moves through the taught series of motions during repetitive work cycles and until the apparatus is turned off.

Referring now to FIG. 6, the control system of the manipulator apparatus is shown therein in somewhat more detailed block diagram form in conjunction with all five axes of movement and illustrates the manner in which the memory drum is programmed during the teaching mode of operation. The memory drum 300 is provided with a series of 60 read-write heads 350 which are spaced along the length of the memory drum 300 and may be employed as either write heads during the teaching operation or as read heads during the repeat mode of operation of the apparatus. In order to increase the versatility of the manipulator apparatus, the memory drum 300 is arranged so that three different programs may be stored within the memory drum 300, any one of these programs being selected from the control panel 44 of the apparatus in accordance with a master control program or by manual selection. More specifically, the periphery of the drum is divided in the manner shown in FIG. 14 so that a program one interval is provided for the first third of a drum revolution, a program two interval is provided during the second third and a program three interval during the final third of each drum revolution. The end points of each of the program intervals are defined by word tracks which are permanently recorded in the memory drum 300 and occur once each revolution at the desired staggered intervals to define the desired program intervals. A series of three timing heads 351, 352 and 353 are provided to sense these word tracks, the timing head 351 detecting the word one track pulses 354 (FIG. 14) the head 352 detecting the word two pulses 355 and the head 353 detecting the word three pulses 356. The outputs of the heads 351, 352 and 353 are supplied to a program selector 360 so as to control the start and stop points of a particular program interval. For example, the timing pulses 354 define the start of the program one interval and the pulses 355 define the end of this interval. During the first program interval clock pulses 358, which are detected by a clock head 359 are selectively supplied to an amplifier 362, the start and stop pulses derived from the program selector 360 being employed to prevent further clock pulses derived from the clock track from appearing in the output of the amplifier 362 during the second and third program intervals.

The clock pulses which are selectively transmitted to the amplifier 362 are supplied to a pulse forming circuit 364 and are then employed as shift pulses which are supplied to an 80-bit shift register 366. In the illustrated embodiment, each program interval includes 80 clock pulses so that 80 bits of information may be recorded along one-third of the periphery of the memory drum 300 during one step of a particular selected program interval. The encoders 310 and 324 associated with the out-in and swivel axes develop 10-bit code numbers, the encoders 314 and 322 associated with the down-up and bend axes develop 11-bit numbers, and the rotary encoder 326 develops a 13-bit number. Accordingly, 55 information bits are required to record all five positions of these encoders. In addition, other auxiliary functions may be selected by the teach control circuits and the control panel 44 and recorded in the memory drum at a particular program step so as to cause the manipulator apparatus to perform auxiliary functions in conjunction with a particular step. For example, a bit designating that the manipulator shall move at a slow speed to the programmed end point may be recorded. Bits representing different accuracies with which the manipulator is to be moved to the designated end points may be recorded, a bit indicating actuation of the hand clamping device, or a bit indicating the end of a particular program may also be recorded. Also, a number of other bits may be recorded for various optional types of operation of the manipulator apparatus with other apparatus, including interlock circuits, and the like. For example, a desired operation may require either that the manipulator apparatus develop an "operate external" (OX) signal at a particular program step, which is supplied to external apparatus to actuate a particular device, or in the alternative that the manipulator apparatus wait until a "wait external" signal (WX) is received from an external apparatus indicating that some particular auxiliary operation has been performed. A number of additional storage bits are thus available in the 80-bit shift register 366 for such options.

Considering now the actual operation of the manipulator apparatus in recording a particular program step during a teaching operation, the teach controls 306 are illustrated in FIG. 6 as individually comprising plus and minus variable voltage sources indicated generally by the potentiometers 370a and 372a which may be selectively supplied to the servo amplifier and servo valve of a particular axis through separate push buttons. For example, the teach controls of the out-in axis 374a comprise an out push button 376a which, when depressed, supplies a positive voltage to the out-in servo amplifier and servo valve indicated by the block 378. In a similar manner an in button 380 may be depressed and supplies a negative voltage to the servo amplifier 378. As described previously, the servo valves of the respective axes respond to the electrical signals developed during the teaching operation by moving the corresponding hydraulic cylinders and the consequent movement in the particular axis is also operative to move the corresponding encoder a proportionate amount. Therefore, as a result of the teaching operation in the out-in axis, the hand assembly is moved to a desired position which is thereafter continuously represented by the digital output of the out-in encoder 310. Similar teach controls 382, 384, 386 and 388 are provided for controlling movement in the swivel, down-up, bend and rotary axes and the push buttons in these respective controls are selectively depressed by the operator for a length of time sufficient to move the hand assembly to the new position in each of the five controlled axes. Preferably, the voltages developed by the teach controls 306 are of relatively small amplitude so that the manipulator arm is moved relatively slowly in each axis thereby facilitating the exact positioning of the arm at the desired position in each axis by the operator. The teach controls 306 as well as the record button 340 and certain other controls, are contained in a portable teach control assembly which is interconnected with the cabinet 42 of the apparatus by means of a flexible cable so that the operator can move to any desired position during the teaching operation and control the recording steps remotely, as will be described in more detail hereinafter.

When the arm and hand assembly has been precisely positioned in each axis and the desired auxiliary functions described above, as well as any desired options, have been set up in the transfer control apparatus 368, the record button 340 is depressed and all of the encoder output signals, auxiliary signals and option signals are transferred in parallel to the 80-bit shift register 366. When this transfer is completed, a signal is supplied to an input gate circuit 370 which permits shift pulses to be applied to the 80-bit shift register 366 so that the digital information which has been transferred to the register 366 is serially supplied through a write amplifier 372 to a particular one of the read heads 350 under the control of a relay selector system 374. Assuming that the selector system 374 is set to supply the recording signal to the first one of the heads 350, the first step in the selected program interval will then be recorded on the memory drum 300. The final output from the shift register 366 is then supplied over the conductor 376 to turn off the gate 370. The end of register pulse is also supplied to the selector system 374 so as to cause the write amplifier 372 to be connected to the next one of the heads 350.

In a similar manner, the teach controls 306 are again selectively actuated to bring the hand assembly 80 to a new position so that new digital information is available from each encoder and this information is again recorded as the second step in the selected program by depressing the record button 340. It will thus be evident that a series of up to 60 program steps may be recorded during a particular program interval, each of these program steps including the absolute position to which the hand assembly is to be moved in each axis, the speed at which such movement is to take place, the accuracy with which positioning is to be accomplished, the actuation of the hand clamping device, and finally in association with the last program step an indication that the end of the program has been reached and that the relay selector system 374 should be reset to the first program step and the cycle repeated. In this connection it should be noted that the program selector 360 and the relay selector system 374 may be controlled by proper interconnections, to provide other combinations than three programs having 60 steps each. For example, the units 360 and 374 may be interconnected to provide a single program having 180 steps which is repeated during repetitive work cycles, as will be readily understood by those skilled in the art.

IN FIG. 7 the operation of the manipulator apparatus in the repeat mode of operation is shown in more detailed block diagram form and in conjunction with all five axes of movement. Referring to this figure, it is assumed that the relay selector system 374 is connected to the first one of the heads 350 which is used as a read head during the repeat operation. The output of this head is sent to a group of control circuits indicated generally at 380 wherein the clock and word tracks are employed to select the desired program interval and the programmed bits of information corresponding to the first recorded step of the selected program. These programmed bits are supplied over the conductor 382 to a sense amplifier 384 from which they are supplied to the 80-bit shift register 366. After the first program step information has been read into the register 366 a signal is supplied over the conductor 386 to the control circuit 380 which respond by sending a control signal over the conductor 388 to a parallel transfer circuit 390 which is interconnected between the 80-bit shift register 366 and an 80-bit buffer storage register 382 on an individual basis for each bit. Parallel transfer circuit 390 then transfers the 80 bits of information in parallel to the 80-bit buffer storage register 392 wherein they are stored until the arm and hand assembly has been moved to the position designated by the position signals stored therein. The position signals stored in the register 392 and representing the desired end points of the program step in each of the five axes, are supplied to a multiplex form of comparing arrangement indicated generally at 394 wherein the encoder signal is compared with the digital command or position signal stored in the register 392 and develops a digital error signal. This digital error signal is converted to an analog voltage which is then demultiplexed and stored both as to direction and distance, these stored signals then being supplied to the individual servo valves corresponding to each axis. The respective servo valves then function to move the corresponding hydraulic cylinder so that the encoders are moved in the direction to reduce the error signal to zero in each axis.

While this motion is taking place, the relay selector system 374 is shifted to the next read head 350 and the second step information is read into the shift register 366. When total coincidence is achieved in all five axes, a signal is developed on the conductor 396 which is supplied to the control circuits 380 which respond by sending a control signal to the parallel transfer circuits 390 over the conductor 388. The parallel transfer circuits 390 then transfer in parallel the 80 bits of information from the shift register 366 to the buffer storage register 392. The information thus stored in the register 392 becomes the new command signals for controlling the servo systems in each axis. At the same time, the relay system 374 is stepped to the next head 350 and the third step information is read into the shift register 366.

In this manner the hand and arm assembly is moved to the respective positions which have been programmed into the memory drum during the teaching operation. When a program step is encountered which includes an end of program bit, this information is supplied to the control circuit 380 over the conductor 398 which respond by resetting the relay selector system 374 to the first programmed step, as well as performing other auxiliary control functions necessary to repeat the recorded program.

In connection with the recording of information on the memory drum 300 during the teaching mode, and the reading out of information during the repeat mode, it is pointed out that if the recording is of the type in which the direction of current in the write head is directly determined by the binary character of the data fed in, i.e., the non-return to zero type of recording, the direction of the current changes only when the binary character changes. Thus, with such a recording system a word consisting of all binary "ONE" or all binary "ZERO" digits has no current reversals in it. Accordingly, when such recorded data is sensed, the head output is zero during the entire binary number, since, with no current reversals there are no flux reversals, and therefore no signal is induced in the read head. Such a recording system is sensitive to error in that any noise or pickup which occurs may change the binary sense of a triggered bistable or flip-flop stage so that all succeeding information data would be incorrect since there would be no corrective output from the read head. Also, residual data on any drum track due to previous recordings which are not properly erased by application of unidirectional current, may be large enough to cause the sense amplifier to trip thus giving an incorrect final output.

In order to overcome these difficulties, the memory drum control circuits 380 preferably employ a system known as phase modulated recording which system has the characteristic that every bit of data, regardless of its binary sense, must include an induced output from the read head, and therefore must have included a current reversal when recorded. The phase modulated system of recording also has the characteristic that the binary sense of the data must be uniquely related to the polarity of the head output.

In such a phase modulated recording system, the clock system is so arranged that not only are the regularly spaced clock pulses 358 available, but also a second signal is available which divides the time interval between clock pulses into first half and second half periods. During the first half period, a binary "ONE" data input must produce positive current in the write head, and during the second half period, it must produce negative current in the head. Similarly, during the first half period a binary data "ZERO" input must produce negative current in the write head and during the second half it must produce positive current in the write head. It will thus be evident that the recorded data will be characterized by always having a flux change during the second half period regardless of the nature of the input data. Furthermore, the direction of such flux change will always be of one polarity for a binary "ONE" and the opposite polarity for a binary "ZERO."

During readout there will be a polarized signal output of the read head for every data bit recorded. During the second half period of each clock pulse, the polarity of the head output will be uniquely related to the binary sense of the recorded data. A read clock or strobe pulse derived from the said second signal and suitably timed to occur in the middle of the second half period is then employed to transmit the output of the sense amplifier 384 to the shift register 366.

Such a phase modulated system of recording and reproduction is particularly important in the control of programmed manipulator apparatus because the loss of only a few digits in a particular command signal may cause the command signal to call for a completely different position than the one originally programmed with the result that the manipulator arm may wreak havoc with the apparatus with which it is being used, since its motion will be completely uncontrolled and unpredictable.

Referring now to FIGS. 8 and 9, the multiplex arrangement is therein shown in block diagram form whereby the encoder signal and memory drum command signal corresponding to each controlled axis are sequentially compared while employing only a single analog to digital converter the output of which is successively distributed to direction and distance control circuits corresponding to each controlled axis. More particularly, the output of the out-in encoder 310 comprises a series of conductors identified as E1, E2–E10 on which the reflected binary code signals corresponding to the particular position of the hand assembly in the out-in axis at any given instant appear. If the reflected binary digit is zero, the corresponding conductor will be at ground potential, whereas if the binary "1" is to be represented the corresponding E conductor will have a negative voltage thereon.

In a similar manner the wrist swivel encoder 324 has a series of digital signals on its output conductors E1, E2–E10, the down-up encoder 314 has a series of digital signals on its output conductors E1, E2–E11, the wrist bend encoder 322 has a series of digital signals E1, E2–E11 on its output conductors and the rotary encoder 326 has a series of digital signals on its output conductors E1, E2–E13. Since the rotary encoder 326 has 13 digits of information, whereas the other four encoders have a lesser number of digits, a number of dummy grounded conductors are permanently connected as outputs of the other four encoders. Thus, for example, the out-in encoder 310 has two grounded conductors 400 and 402 below the least significant digit conductor E1 of the encoder 310. This encoder also has a grounded conductor 404 above the most significant digit E10. The other encoders are similarly wired so that a 13-digit output signal is available from each encoder. The reason for placing two grounded conductors, such as the grounded conductors 400 and 402 below the least significant digit will be described in more detail hereinafter in connection with the analog-to-digital converter portion of the system.

The 13 digital output conductors of each of the five encoders are supplied to the five terminals 406, 408, 410, 412 and 414 of a multi-level scanning or multiplexing switch indicated generally at 416, the switch 416 being continuously rotating so that the outputs from the five encoders are sequentially supplied to the common conductors 418 of the switch and to the input of a Gray to binary code converter 420. The output of the converter 420 is supplied to a comparator indicated generally at 422.

The 10-bit out-in command signal derived from the buffer storage register 392 is represented by the block 424 as having the digital output conductors A1, A2–A10. In a similar manner the wrist swivel command is indicated by the block 426, the down-up command by the block 428, the wrist bend command by the block 430 and the rotary command by the block 432. Since the number of digits of each of the command signals corresponds to the encoder signal, a number of grounded dummy conductors are also provided in association with each command signal to permit comparison with the code signal. For example, the grounded conductors 434 and 435 are provided below the least significant digit A1 in the out-in command signal block 424. The multi-digit command signals corresponding to each axis are supplied to the respective contacts 436, 438, 440, 442 and 444 of a multi-level scanning switch which is indicated generally at 446 and is driven in synchronism with the switch 416 by a suitable scanner drive arrangement. As a result, the digital output corresponding to each command signal is sequentially supplied to the common conductors 448 of the switch 446 which are connected to the input of a Gray to binary code converter 450 the output of which is supplied over the conductors 452 to the other input of the comparator 422.

The comparator 422 must compare the binary encoder signal with the binary command signal and develop a binary error signal representing in digital form the difference between these two numbers. However, it is also necessary to determine the direction in which the controlled axis must be moved since the actual position of the controlled part may be in two positions, one on either side of the command position and still give the same magnitude of error signal. In accordance with a particular feature of the invention, the comparator 422 performs the mathematical function of subtraction by complementary addition in which a 13-digit error signal is developed on the output conductors S1, S2–S13 and in addition a final carry signal is developed on the conductor 454 which is employed to detect the direction of the desired movement.

The output signals on the conductors S1, S2–S13 will change during the period when the scanning switches 416 and 446 remain connected to a particular axis due to the fact that the encoder signal will be continuously varying as the controlled part is moved in that axis in response to the movement of the corresponding hydraulic cylinder to reduce the error. Also, the outputs on the conductors S1, S2–S13 and the final carry conductor will change to a new set of error signals and final carry signals each time the scanning switches are moved to a different controlled axis. In this connection it will be understood that the scanning switches 416 and 446 are preferably of the type which maintain connections to one set of contacts, such as the contacts 406, for a predetermined interval of time and then are immediately switched to the next set of contacts 408. In the alternative, electronic switching may be employed, as will be described in more detail hereinafter.

The total scanning cycle time of the scanning switches 416 and 446 is preferably in the order of 1 millisecond during which period each of the five control signals is supplied to the comparator 422 for a duration of approximately 200 microseconds. The 13-digit error signal is supplied from the comparator 422 to a digital to analog converter 456 wherein it is converted to a corresponding analog signal. Since the comparator output signal is continuously changing as the inputs thereto are switched to the five different control axes, the output of the digital to analog converter 456 will also change for each multiplex channel. However, the analog signal developed on the output conductor 458 of the digital to analog converter 456 is distributed by means of a scanning switch indicated generally at 460 to five contacts 462, 464, 466, 468 and 470 corresponding to the five controlled axes. In addition, a positive direction signal developed on the conductor 457, or a negative direction signal developed on the conductor 459, is also distributed by the switch 460 to each set of circuits associated with each controlled axis.

More particularly, a direction and distance control circuit 472 is connected to the switch terminal 462 and the conductor A supplied to this circuit corresponds to the analog signal developed on the conductor 458. A storage capacitor 474 is connected from the conductor A to ground, so that a voltage is developed across the capacitor 474 which is equal in amplitude to the error signal produced when the comparator 422 is connected to the encoder and command signals corresponding to the out-in axis. As a result, the voltage across the capacitor 474 represents the stored distance to which the out-in axis is to be moved to reach the desired end point. The plus or minus direction signals appearing on one of the conductors P or M, is also stored in the circuit 472 and an output current signal having a direction of flow corresponding to the stored direction and having an amplitude corresponding to the stored distance is supplied to the out-in servo valve 182 so that this valve controls the out-in hydraulic cylinder 72 to move the controlled part in the desired direction to reduce the error signal to zero.

In a similar manner the distributor switch 460 supplies the corresponding direction and distance signals during the next multiplex interval to the terminal 464 so that the direction and distance required in the wrist swivel axis can be stored in the circuits 474. Movement to the terminals 466, 468 and 470 likewise permits storage of the desired direction and distance signals in the circuits 476, 478 and 480 associated with the other three axes. While the switch 460 has been illustrated as controlled by the same scanner drive which controls the switches 416 and 466, when an electronic scanning system is employed the distribution intervals of the switch 460 are preferably made only during the last half of each multiplex interval, as will be described in more detail hereinafter.

When all digits of the binary error signal down to the least significant digit S1 become zero, no signal is produced on either the plus or minus conductors 457, 459. Accordingly, a signal is produced in each of the circuits 472–480 which represents completion of the commanded movement in that particular axis. These completion signals are transmitted by way of the conductors 482, 484, 486, 488 and 490 to a group of control circuits identified as accuracy control circuits 492. Upon coincidence of completion signals on all of the conductors 482–490, a total coincidence signal is developed on the output conductor 396 which is supplied to the memory drum control circuits 380 as shown in FIG. 7. In addition, two other accuracy control signals are developed in the digital to analog converter 456 and supplied by way of the conductors 494 and 496 to the accuracy control circuits 492 so that three different accuracy signals are available for control of the memory drum, as will be described in more detail hereinafter.

Referring now to FIGS. 10, 11 and 12, the detailed circuitry of the common digital to analog converter 456 is shown therein. Also, the detailed distance and direction circuits associated with each axis for developing the required current signal for the servo valve input coil are shown in these figures together with certain associated control circuits which are employed to perform additional functions in the manipulator apparatus. The 13 digital output conductors from the comparator 422 are shown as the conductors S1–S13 inclusive with the least significant digit conductor S1 at the bottom. All of the digit signals, from the most significant digit S13 down to the least significant digit S1, are interconnected through a chain of OR gates so as to establish a series of "bounds" or boundary conditions which are employed to perform control functions in the digital to analog converter and are also employed to derive distance information. More particularly, the S12 and S13 conductors act as the two inputs of an OR gate 500. The output of the OR gate 500 is supplied as one input of the next OR gate 502 the other input of which is the signal appearing on the conductor S11. The output of the OR gate 502 is likewise employed as one input of a two-input OR gate 504 the other input of which is the signal appearing on the conductor S10. In a similar manner, successive OR gates 506, 508, 510, 512, 514, 516, 518, 520 and 522, are interconnected with successively lower conductors and the output from the preceding OR gate.

The terminals S1–S13 have applied thereto a negative voltage which may vary from minus 10 volts to minus 12 volts, depending upon varying circuit conditions, when a binary "ONE" digit is to be represented. When a binary digit of "ZERO" is to be designated, these conductors have ground potential appearing thereon. Accordingly, as long as a binary "ONE" is present at a particular digit level or a higher level, a negative binary "ONE" signal will be developed by the corresponding OR gate. For example, if a binary "ONE" appears at any level from S9 up to S13, a binary "ONE" output will be developed by the OR gate 506. However, when the S9 level and all higher levels are zero, then the output of the OR gate 506 is zero. It will thus be seen that the output conductor 524 of the lowest level OR gate 522 is always a binary "ONE" until there is no error, i.e., until a binary "ZERO" appears at the least significant digit level S1.

The lowest level bound signal appearing on the conductor 524 is employed in conjunction with the final carry signal, which is developed in the comparator 422 and appears upon the conductor 454, to derive a plus or minus direction signal indicative of the direction in which the controlled part is to be moved. These direction signals are distributed to the respective direction circuits associated with each axis. In considering how this is accomplished, it is first pointed out that the comparator 422, since it is a subtraction by complementary addition circuit, will provide a final carry pulse only when it is subtracting a smaller number from a bigger number. Thus, whenever the comparator 422 develops a final carry pulse, one knows that the encoder signal is larger than the command signal, for example, and this final carry pulse is arbitrarily designated as a minus direction pulse. On the other hand, if no final carry pulse is present in the output of the comparator 422, two conditions may be responsible for such absence of a final carry pulse. Either a bigger number is being subtracted from the smaller number, or the two numbers are equal, since in both instances no final carry pulse is produced. However, as long as a signal is being produced at the output of the lowest level OR gate 522, one knows that the two numbers being compared are not equal. Therefore, the absence of a final carry signal on the conductor 454 and the presence of a bound signal on the conductor 524 indicates that the controlled part should be moved in a positive direction. To this end, the output of the OR gate 522 is supplied as one input to an AND gate 526 and a signal representing no final carry is supplied as the other input of this AND gate. Only when both of these signals are present is an output developed by the AND gate 526 which is supplied by way of the conductor 528 to an electronic distributing arrangement. This distributing arrangement corresponds to the mechanical switching arrangement 460 shown in FIGS. 8 and 9 and comprises a ring of five counter 530 which is driven from a 10-kilocycle oscillator 532 through a flip-flop 531. The ring of five counter is provided with five output conductors on which are successively produced enabling pulses of approximately 200 microseconds duration. These pulses are supplied to the multiplex portion of the equipment comprising the switches 416 and 446. It should also be noted that the comparator 422 may also be of the direct subtraction type in which case the final borrow pulse is used for direction information in place of the final carry pulse as described above.

In order that both the direction signal and the analog signal may be distributed to the respective axes during the latter half of each multiplex period, so that the comparator 422 has a chance to switch to a new controlled axis and switching transients on the output conductors S1–S3, may have a chance to disappear before the distribution period, a gating arrangement is employed which combines the output of the flip-flop 531 with the output of the respective conductors supplied to the multiplex switches 416 and 446 so that distributor pulses of 100 microseconds duration are developed only during the last half of each 200 microseconds multiplex impulse. More specifically, the output of the flip-flop 531 is supplied to a series of five AND gates 533, 535, 537, 539 and 541, and the five multiplex output conductors from the ring of five counter 530 are supplied as the other input of these AND gates. As a result, distributor pulses are produced on the output conductors 534, 536, 538, 540 and 542 of these AND gates which occur during the last half of each multiplex pulse period and have a duration of approximately 100 microseconds.

If a minus direction signal appears upon the conductor 454, this signal is applied as one input of a two input AND gate 530a which has as its other input the distributor pulse output conductor 542. Accordingly, during the last half of the interval assigned to the out-in direction axis, a signal is developed by the AND gate 530a which indicates movement in the minus direction and this signal is supplied to a flip-flop 532 so as to set this flip-flop in a condition indicating the minus direction. On the other hand, if a plus signal is developed on the conductor 528, this signal is supplied as one input of a two-input AND gate 534 the other input of which is also supplied from the conductor 542 so that a positive triggering signal is supplied to the flip-flop 532 so as to set this flip-flop in the opposite condition. The output of the flip-flop 532 is supplied over the indicated conductors P0 to M0 to the out-in distance circuit indicated generally at 536 and is utilized to control the direction of current flow through the out-in servo valve input coil 538, as will be described in more detail hereinafter.

When total coincidence occurs down to the least significant digit of the encoder and command signals, the bottom OR gate 522 no longer develops an output signal and consequently the AND gate 526 does not produce an output signal on its output conductor 528. Also, if the encoder and command signals are equal, there will be no final carry signal on the output conductor 454 of the comparator 422. This digital indication that complete coincidence has been achieved is utilized as a total coincidence signal rather than employing the actual stored distance value. However, it is then necessary to store an indication that total coincidence has been achieved in each axis since the signals on the conductors 454 and 524 will change for each channel of the multiplex cycle depending upon whether or not coincidence has been achieved in a particular axis. Accordingly, an AND gate 540a is provided to the two inputs of which are supplied signals representing the absence of an output from the AND gates 530a and 534, i.e., total coincidence for movement in the out-in direction. The output of the AND gate 540a is supplied to a flip-flop 542a and when this flip-flop is set to the condition indicating total coincidence a ground signal is supplied therefrom through the diodes 544 and 546 to the P0 and M0 conductors, thus grounding out these conductors and preventing any current from being supplied to the servo valve input coil 538. The flip-flop 542a remains in this total coincidence condition until it is reset by a pulse from the memory drum control circuits which is applied to the terminal 548.

Since the direction signal and hence the total coincidence signal, are provided on a multiplex basis from the digital output of the comparator 422, it is necessary to store plus or minus direction signals for each of the other four axes and to ground out these conductors when total coincidence is achieved. To this end, a pair of AND gates 550 and 552 are energized from the conductors 528 and 454, respectively, and from the second channel distributor pulse conductor 540, the remaining circuitry for the wrist swivel direction signals being indicated by the block 554. A pair of AND gates 556 and 558 are energized from the distributor pulse conductor 538 and the above-described plus and minus conductors, the associated circuits being indicated as the block 560 for the down-up direction. A pair of AND gates 562 and 564 are provided for wrist bend direction indicated by the block 566 and a pair of AND gates 568 and 570 are provided for the rotary direction circuits 572.

In order to provide a total coincidence signal which will indicated when total coincidence has been achieved in all axes of the manipulator apparatus and to the closest accuracy as determined by the least significant digit of the respective encoders for each axis, there is provided a five input AND gate 574 to which the outputs of the flip-flops corresponding to the flip-flop 542a in the out-in direction axis are supplied. More particularly, the output of the flip-flop 542a is supplied over a conductor 576 and the outputs of the other four flip-flops in the respective axes are supplied over the conductors 578, 580, 582 and 584. The output of the AND gate 574, which is designated ACCURACY NO. ONE to indicate that the signal developed by the AND gate 574 will only be produced when all five axes have been moved to the closest possible coincidence, is supplied to a three input OR gate 586 having two other inputs identified as ACCURACY NO. 2 and ACCURACY NO. 3. These other accuracy signals will occur when the encoder signal is not in exact coincidence with the command signal, as will be described in more detail hereinafter, in the event that exact coincidence is not desired for a particular step of the recorded program. As described hereinafter, the use of these lower accuracies for coincidence permits curved motion of the hand assembly which is desirable under certain conditions of operation of the manipulator apparatus.

Considering now the manner in which the multiplexed digital output signal of the comparator 422 is converted to an analog voltage representing the distance to which the controlled part is to be moved in each axis, a ladder type summation network and function generation network is connected between conductors S1–S11 of the comparator output. This ladder network comprises the series resistors 590, which are connected in series with each of the input conductors S1–S11 and a series of resistors 592 which are connected between each pair of the resistors 590. A resistor 594 is connected from the junction of the resistors 590 and 592 associated with the conductor S11 to ground and a resistor 596 is similarly connected to ground from the bottom of the ladder network. The resistors 590, 594 and 596 all have a value equal to twice the resistance value of the resistors 592.

In order to standardize all of the digital signals coming from the comparator 422, each of the output conductors of this comparator up to the conductor S11 is clamped to a stabilized reference voltage of minus 9 volts. More particularly, a diode 598 is connected between the conductor S11 and a stabilized minus nine volt supply. Accordingly, the digital signal on the conductor S11 which may vary from minus 10 volts to minus 12 volts depending upon various circuit conditions, is clamped to minus 9 volts by conduction of the diode 598 so that a stabilized input signal of minus nine volts is applied to this point of the ladder network when a binary "ONE" signal is produced on the conductor S11. In a similar manner all of the other conductors S10–S1 are similarly clamped to the reference supply through the diodes 600, 602, etc.

The illustrated ladder network has the property that when a maximum error signal corresponding to the digit level S11 occurs, i.e., when binary "ONE" signals appear on all of the terminals S1–S11, inclusive, an output voltage is developed at the upper end of the ladder network, i.e., the conductor 604 which is exactly two-thirds of the reference voltage, or minus 6 volts DC. Furthermore, this same maximum error voltage will be produced at each level of the ladder network when all of the lower levels are also at maximum error, i.e., binary "ONE" signals. Thus, for example, when all of the first five conductors S1–S5, inclusive, have binary "ONE" signals thereon, a voltage is produced at the fifth level output of the ladder network, i.e., the conductor 606 of minus 6 volts.

Since each level of the ladder network thus arrives at the same output voltage for maximum error at that level, the outputs of different levels of the ladder network may be combined in a final summation network to provide a composite analog error signal having the desired shape such that a desired deceleration characteristic for the manipulator arm and hand assembly can be achieved. To this end, the output of the fifth level of the ladder network, i.e., the conductor 606 is supplied to a function generation network indicated generally at 608, the output of the S6 level, i.e., the conductor 614, is supplied to a function generation network 612, the S7 level is supplied by way of the conductor 618 to a function generation network 616, the S8 level is supplied by way of the conductor 622 to a function generation network 620, the S9 level is supplied by way of the conductor 624 to a function generation network 625, the S10 level is supplied by way of the conductor 626 to a function generation network 628 and the S11 level is supplied by way of the conductor 604 to a function generation network 630. The outputs of these 7-function generation networks are all connected in parallel to a common summation resistor 632 so that the incremental currents supplied by each network are summed in the resistor 632 to provide a composite analog error signal. The ladder levels S1–S4, inclusive, are not utilized to develop increments of the analog signal because a deceleration characteristic of the desired shape can be achieved without using these levels.

While, as has been stated, the output of each level of the ladder network increases to a maximum of minus 6 volts, when a maximum error occurs at that level, when a slightly larger error signal occurs the output of the lower level will change back to a small value, or even to zero. Accordingly, it is necessary to provide a fixed increment of voltage for the composite error signal under all conditions where the maximum error signal exceeds a particular level of the ladder network at which an increment is derived. For example, considering the S5 level, the output on the conductor 606 will be minus 6 volts when binary "ONE" signals are supplied to all of the conductors S1–S5. However, the next higher bit error signal would be binary 100000 which would mean that a binary "ONE" signal appears on the conductor S6 and binary "ZERO" signals appear on all of the conductors S1–S5. Under these conditions, the voltage on the conductor 606 would drop back to zero whereas the voltage on this conductor should remain at minus 6 volts since the error is slightly larger than it was before and the function generation network 608 should continue to contribute the same increment of voltage to the composite error signal.

In order to achieve this desired end result, the bound signals developed by the OR gates 500–512, derived from the conductors S6–S13, inclusive, are employed to control the function generation networks so that a constant voltage is developed by each function generation network for all error signals having an amplitude greater than the level assigned to a particular function network. Thus, considering the function network 608, the output from the fifth level of the ladder network, i.e., the conductor 606, is supplied to the base of a transistor 640, the collector of which is connected to the common summation resistor 632. A resistor 642 is connected in series with the emitter of the transistor 640 and through a diode 644 to the output of the OR gate 512 which is supplied to the function generation network 608 by way of the conductor 646. If the error signal is no larger than the fifth level of the ladder network, binary "ZERO" will be present on all of the conductors S6–S13 so that the output of the OR gate 512 is zero, i.e., at ground potential. Since the upper end of the common summation resistor 632 is connected to minus 18 volts, a current will flow through this resistor the magnitude of which is determined by the value of the resistor 642 and also the value of the voltage applied to the base of the transistor 640. As indicated previously, the value of the voltage applied to the base of the transistor 640 will be minus 6 volts when maximum error at the fifth level occurs, i.e., when a binary "ONE" signal occurs on the conductors S1–S5.

If the error signal is one bit larger than this fifth level maximum level, a binary "ONE" signal will occur on the S6 conductor and binary "ZERO" signals will occur on the conductors S1–S5. A binary "ONE" signal on the conductor S6 will be transmitted through the OR gate 512 and is utilized by the function network 608 to shut off current conduction in the transistor 640 and to substitute a fixed value of current flow to the common resistor 632 which is maintained for all error signals greater than the fifth level maximum value. More particularly, when the OR gate 512 develops an output signal, a negative voltage is supplied over the conductor 646 to the diode 644 and cuts off current conduction through the transistor 640. A second transistor 648 has its collector connected to the summation resistor 632 and has its emitter connected through a resistor 650 to ground. The base of the transistor 648 is connected to ground through a resistor 652 and the minus 9-volt reference supply is connected through a diode 654 to the base of the transistor 648. The output of the OR gate 512 is also supplied by way of the conductor 646 to the base of the transistor 648. When the conductor 646 is at ground potential, the transistor 648 is cut off and contributes no current flow through the common resistor 632. However, when a negative bound signal is developed on the conductor 646, i.e., when the error voltage exceeds the maximum fifth level value, the diode 654 clamps the conductor 646 to minus 9 volts and this 9 volt signal is applied to the base of the transistor 648 to establish a predetermined current flow through the common resistor 632 as determined by the value of the emitter resistor 650. The value of the resistor 650 is so chosen that the current through the transistor 648 is exactly the same as the current flow through the transistor 640 at the maximum fifth level error just before the transistor 640 was rendered nonconductive. Accordingly, a fixed increment of composite error voltage is contributed by the transistor 648 for all error signals which are greater than the maximum fifth level value.

The other function generation networks 612, 616, 620, 625, 628 and 630, are all similar to the function generation network 608 except for the fact that the resistors 642 and 650 in each of these networks may be given different values so as to provide a particular shape of composite error signal, and hence a particular deceleration characteristic for the manipulator apparatus. In this connection it will be noted that no function generation networks are provided for the top levels S12 and S13 of the error signal. Accordingly, when the error signal is greater than the maximum value of the S11 level a fixed amplitude composite error signal corresponding to minus 6 volts from the ladder network, is developed across the common resistor 632. However, as described heretofore, this composite error signal will consist of increments contributed by each of the described function generation networks. When the error signal goes below the maximum S11 level value, this composite error signal will be reduced in value due to the reduction in current flow through the transistor 640 of the uppermost function network 630 while the outputs from the lower function networks 608, 612, 616, 620, 625 and 628 remain at a fixed value. When the error signal decreases below the maximum 10th level value, the transistor 640 in the associated function network 628 is also switched into the circuit and the current through this transistor decreases as the error voltage contrinues to decrease. At the same time, the current through the transistor 640 of the uppermost function generation 630 also decreases. In a similar manner the transistors 640 of successively lower function networks are selectively switched into the circuit as the error voltage decreases until finally all of the fixed increment transistors 648 of the function networks have been switched out of the circuit and all of the transistors 640 of these networks are connected in parallel to the resistor 632 and contribute increments to the composite error signal. The current through all of these transistors continues to decrease as the error signal decreases below the maximum fifth level value and the current increments contributed by each transistor become progressively smaller as total coincidence is approached.

It will be noted that the output analog signal on the conductor 664 results from a summation of increments derived from various levels of the ladder network down to the S5 level. If the entire ladder network 590, 592 were employed to derive an error signal which is accurate down to the least significant digit, the resistors 590, 592, 594 and 596 of this ladder network should be more accurate than the accuracy of the encoders in order to take advantage of the full accuracy of these encoders. However, for an 11-bit encoder, the encoder signal is accurate to 1 part in 2,048. Accordingly, the accuracy of the resistors in the entire ladder network should have an accuracy better than 0.05 percent and such resistors are quite expensive. Furthermore, if the output of the entire ladder network, i.e., the voltage on the conductor 604, were employed directly as the analog signal, the following servo amplifier would have to respond to 1 two-thousandth of the maximum voltage available on the conductor 604 which would be only a few millivolts. Accordingly, this would mean that the servo amplifiers would have to be extremely sensitive.

When a large error signal exists it is not necessary to provide an accurate analog signal. The only time that accuracy is required is when the error signal is small. These conditions are fulfilled in the arrangement of the present invention and without requiring the ladder network to be made up of extremely accurate resistors. Thus, as the magnitude of the error signal decreases, the bound signals move down the ladder network so that, in effect, the error signal is magnified as it approaches zero and hence high accuracy resistors are not required. It is only when the error signal falls to the relatively low value at which the voltage on the S5 level conductor 606 becomes less than minus 6 volts that the accuracy of the ladder network resistors becomes important. This is equivalent to only a 5-bit number having an accuracy of substantially less than 1 part in 100 and hence all of the resistors 590, 592, 594 and 596 in the entire ladder network may be of much wider tolerances and hence may be much less expensive. Furthermore, a less sensitive servo amplifier is required, since the output voltage for the least significant digit is considerably larger than it would be if the output of the entire ladder network were taken as the final error signal. However, since the error signal is in effect magnified by moving down the ladder network, the manipulator arm may still be positioned at the desired end point with the desired accuracy discussed heretofore.

The output of the common resistor 632 is supplied to the base of a transistor 565 the emitter of which is connected through resistor 658 to the minus 18 volts supply and the collector of which is connected through a resistor 660 to ground. This collector is also connected directly to the base of an output emitter follower transistor 662 so that an analog signal corresponding to the digital error signal supplied from the comparator 422 is produced on the output conductor 664. However, the analog signal corresponding to a particular controlled axis lasts only for approximately 200 microseconds while a particular error signal combination is supplied from the comparator 422. The output on the conductor 664 is thus constantly changing to an analog value corresponding to the distances represented by the difference between the encoder and command signals for each of the five axes of the system.

This multiplex analog signal is then distributed to the corresponding distance circuits corresponding to each axis. More particularly, the output conductor 664 is connected in parallel to the source element of a series of five field effect transistors 666, 668, 670, 672 and 674, one for each of the five controlled axes of the apparatus. The distributor pulse signals developed by the AND gates 533, 535, 537, 539 and 541 are supplied individually to the gate elements of these field effect transistors and the drain elements thereof are connected to respective storage capacitors 676, 678, 680, 682 and 684 provided for each of the five controlled axes. The distributor pulses produced on the conductors 534, 536, 538, 540 and 542, thus act successively to render the field effect transistors conductive during the last half of each multiplex pulse so that the analog voltage appearing on the conductor 664 successively applied to the storage capacitors and charges these capacitors individually to the value of the error signal then existing in each axis. As a result, a stored signal is developed across each of the capacitors 676-684, representative of the distance to be moved in each axis.

Considering the out-in axis, the voltage across the capacitor 676 is supplied through a series resistor 686 and a sensitivity potentiometer 688 to the input of a servo amplifier 690 wherein the voltage stored in the capacitor 676 is amplified and is supplied to a bridge type output network which includes the servo valve input coil 538 of the out-in servo valve 182. This output network includes a pair of electronic switches 692 and 694 one side of which is connected together and to the minus 18-volt supply and the other side of which is connected to the opposite ends of the servo input coil 538. A control transistor 696 is connected from the junction of the switch 694 and the coil 538 through a small feedback resistor 698 to ground. In a similar manner a control transistor 700 is connected from the junction of the switch 692 and the coil 538 through the resistor 698 to ground.

The current through the transistors 696 and 700 is arranged to be selectively controlled in value in accordance with the value of the output of the servo amplifier 690, depending upon the direction in which the controlled part is to be moved. More particularly, the output of the servo amplifier 690 is supplied to the base electrodes of a pair of transistors 702 and 704, the emitter of these transistors being connected to ground and the collectors thereof being connected respectively to the base electrodes of the transistors 696 and 700. The collector of the transistor 702 is also connected through a load resistor 706 to minus 18 volts and the collector of the transistor 704 is connected through a load resistor 708 to minus 18 volts.

In order to control the direction of current flow through the input coil 538, the voltages appearing upon the PO and MO conductors in the out-in direction circuit are connected to control conduction through the switches 692 and 694, in series with one of the control transistors 696 or 700. More particularly, if a positive direction is indicated a negative signal is produced on the conductor PO which is applied to the switch 694 to close this switch. Also, the voltage on the conductor PO is applied to the base of a switching transistor 710 the emitter of which is connected to ground and the collector of which is connected to the base of the transistor 700. The switching transistor 710 is thus held nonconductive so as to permit the voltage appearing at the output of the servo amplifier 690 to control current flow through the transistor 700 through the intermediate control transistor 704. At the same time, a ground signal appears on the minus conductor MO which is supplied to the switch 692 so as to open this switch and prevent current flow from the left-hand side of the coil 538 to the minus 18-volt supply. In addition, the voltage on the conductor MO is supplied to a switching transistor 712 the emitter of which is connected to ground and the collector of which is connected to the base of the control transistor 696. A ground signal on the base of the transistor 712 renders this transistor conductive so that current flow through the common load resistor 706 biases off the transistor 696 and prevents current flow through this transistor. As a result, current can only flow through the control transistor 700, through the input coil 538 in the direction of the arrow 714 and through the switch 694 to the minus 18-volt supply. Furthermore, the value of this current is controlled by the output of the servo amplifier 690 so that the hydraulic cylinder 72 is moved in the desired direction at a speed corresponding to the value of current flow through the coil 538. When a minus direction is called for, the plus conductor PO is at ground potential so that the transistor 710 is rendered conductive and biases off the control transistor 700 so that no current can flow through this transistor, while at the same time the switch 694 is opened. A negative voltage on the MO conductor causes the switch 692 to be closed and the transistor 712 to be rendered nonconductive so that the control transistor 696 can be controlled in accordance with the value of the output signal from the servo amplifier 690. Current then flows through the resistor 698, the control transistor 696, through the input coil 538 in the direction of the arrow 716 and through the switch 692 to the minus 18-volt supply. The voltage produced across the resistor 698 is applied as a feedback signal to the input of the servo amplifier 690 for either direction of current flow through the coil 538. The analog voltages stored for the other four axes in the storage capacitor 678, 680, 682 and 684 are likewise applied to similar distance circuits, identified by the blocks 720, 722, 724 and 726, respectively.

It will be recalled that a maximum error signal of minus 6 volts is developed by the digital to analog converter which means that a maximum minus 6-volt signal is applied to the servo amplifier 690 which will result in a certain velocity of movement of the hydraulic cylinder 72. However, under certain conditions it is desirable to limit the maximum value of voltage which can be applied to the servo amplifier 690 to a value somewhat less than minus 6 volts so that the maximum speed of the cylinder 72 is limited to a somewhat value. To accomplish this a limiting transistor 730 is provided, the emitter of which is connected to the junction of the resistor 686 and the potentiometer 688 and the collector of which is connected to ground. The base of the transistor 730 is connected to a variable DC voltage established across a potentiometer 732. When the voltage across the capacitor 676 increases negatively to the value of the voltage applied to the base of the transistor 730, as determined by the setting of the potentiometer 732, the transistor 730 will conduct and prevent the voltage across the capacitor 676 from becoming more negative thus limiting the maximum speed of the associated cylinder 72. Corresponding potentiometers in the other four controlled axes are likewise connected to a common terminal 734, as indicated by the connections 736, and a relay 738 is employed selectively to supply minus 6 volts or a minus variable voltage supply to the upper end of all five potentiometers 732. The relay 738 is controlled from the register 392 in accordance with a speed signal which has previously been programmed into the memory drum 300 at that particular program step if the maximum speed in all five axes is to be limited to a value different from the normal value corresponding to minus 6 volts. This variable voltage supply may be adjusted from the control panel 42 to any desired lower speed in all five axes. In addition, each of the potentiometers 732 may be adjusted to give a desired maximum speed of movement of the controlled part in a particular axis for a particular application. However, the adjustment of the potentiometer 732 will hold for all steps of a particular program whereas the speed change effected by the relay 738 may be changed from one step to another in a given program.

In order to provide further control over the deceleration characteristic of the controlled cylinder in each axis, there is provided at the input of each servo amplifier 690 a resistor 740 which is connected from the right-hand side of the potentiometer 688 to ground. The potentiometer 688 and the resistor 740 thus act as a voltage divider network which may be adjusted by adjustment of the potentiometer 688 to vary the deceleration characteristic or damping characteristic of the controlled part in a particular axis. Adjustment of the damping potentiometer 688 has the effect of further limiting the maximum voltage which can be applied to the servo amplifier 690 and hence acts as a further speed limiting adjustment. However, the potentiometer 688 also adjusts the gain or sensitivity, i.e., the amount of input voltage which is required to develop a given output voltage at the output of the servo amplifier 690. By adjustment of the limiting potentiometer 732 and the damping potentiometer 688 a particular desired deceleration characteristic may be achieved which is adapted for a particular load or no load condition of the manipulator apparatus. For example, at a particular setting of the damping potentiometer 688, adjustment of the potentiometer 732 to a higher maximum speed condition also has the effect of starting deceleration earlier since the slope of the curve as determined by the potentiometer 688 remains constant. On the other hand, for a fixed setting of the potentiometer 732, adjustment of the potentiometer 688 will have the effect of further reducing the maximum speed obtainable in that axis while at the same time changing the slope of the deceleration curve from maximum speed to zero.

When the manipulator apparatus is started up at the beginning of a work period, there is a certain series of steps which must be taken to in insure that the manipulator apparatus is properly interlocked with other apparatus and is ready to perform repeated cycles in the manner programmed into the memory drum. Such a procedure may be called a preferred startup procedure and is a somewhat lengthy procedure involving certain delays necessary for the warmup of particular apparatus, etc. On the other hand, under certain conditions it is desirable to stop the manipulator apparatus, even in the middle of a programmed step, to correct some part of the procedure and then immediately start the manipulator apparatus running again. Under both conditions of initial startup and when it is desired to stop the apparatus momentarily, it is desirable not to make abrupt changes in the motions of the hand and arm assembly which may exceed the acceleration or deceleration forces to which the apparatus is designed. Accordingly, in order to control the speed with which the manipulator apparatus is brought to a halt, as well as the speed at which it is brought back to its previous condition of movement after a momentary halt, there is provided a master control circuit which includes a relay 742 which is connected in series with a battery 744 and a cycle start button 746. The normally closed contacts 748, 749 of the relay 742 are connected in parallel with a hold-run switch 751, the parallel combination of the contacts 748, 749 and the switch 751 being connected between a positive supply voltage and a ramp generator 764. The ramp generator 764 responds to the connection of a plus voltage to its input lead 763 by developing ground potential on its output conductor 765. This output conductor is supplied in parallel to the input terminals of all of the servo amplifiers 690 in each of the five controlled axes of the manipulator apparatus through the respective axes of the manipulator apparatus through the respective diodes 750, 752, 754, 756 and 758. Accordingly, when the ramp generator 764 develops ground potential on the conductor 765, the inputs of all five servo amplifiers 690 are grounded so that no movement in any of the controlled axes of the apparatus is possible.

The hold-run switch 751 is normally open when it is in the run position and is closed to effect a hold operation. Assuming that the hold-run switch 751 is open and that the relay 742 is de-energized so that the contacts 748, 749 are closed, a positive voltage is applied to the ramp generator 764 so that ground potential is produced on the conductor 756 and all movement of the manipulator apparatus is prevented. After the manipulator apparatus has gone through a preferred startup procedure, the cycle start button 746 is depressed so that the relay 742 is energized and the contacts 748, 749 are opened. When this occurs, the contacts 760, 761 of the relay 742 are closed and are connected across the terminals of the cycle start button 746 through a normally closed stop button 762. Accordingly, a holding circuit is set up whereby the relay 742 remains energized after the cycle start button is released.

When the contacts 748, 749 are opened, and assuming that the hold run switch 751 is in the run or open position, plus voltage is no longer applied to the input conductor 763 of the ramp generator 764. The ramp generator thus responds to removal of this plus voltage from its input by producing a gradually decreasing ramp voltage which carries the output conductor 765 from ground down to negative potential. This negatively going ramp voltage requires approximately one-half second to reach a negative voltage corresponding to the maximum voltage applied to the input of the servo amplifiers. Accordingly, this ramp voltage prevents the servos from responding more quickly than the ramp signal itself. The negative voltage to which the conductor 765 is brought by the ramp generator 764 is large enough so that the diodes 750-758, inclusive, are thereafter rendered nonconductive and do not interfere with the normal operation of the servo amplifiers 690 in responding to analog voltages developed across the respective storage capacitors, such as the capacitor 676. In this connection it will be understood that the ramp generator 764 may comprise any capacitor charging and discharging circuit arrangement suitable for producing the above-described ramp voltage output, as will be readily understood by those skilled in the art.

When it is desired to momentarily halt the manipulator apparatus without depressing the stop button 762 (which would require going through the complicated startup procedure again) the hold-run switch 751 may be thrown to the hold position in which the switch 751 is closed so that a plus voltage is applied to the input of the ramp generator 764 over the conductor 763. The ramp generator responds to this plus voltage by gradually increasing the potential appearing on the conductor 765 from its previous negative value back to ground potential at the same rate of approximately one-half second for such voltage increase. When this occurs, the diodes 750–758 are rendered conductive as the ramp voltage approaches ground and smoothly bring all of the input signals applied to the servo amplifiers 690 to ground so that the manipulator apparatus is decelerated smoothly to a halt in all axes. When it is again desired to start the manipulator apparatus, the hold-run switch 751 is opened and the ramp generator 764 responds thereto by again causing the voltage on the conductor 765 gradually to decrease from ground potential to a negative voltage which is of sufficient amplitude to render the diodes 750–758 non-conductive. Since the control system itself has not been turned off when the hold-run switch 751 is thrown to the hold position, voltages may still be present on the storage capacitors 676–684. Accordingly, when the ramp voltage on the conductor 765 is again gradually changed to a negative potential, the diodes 750–758 are rendered nonconductive and the servo amplifiers 690 immediately respond to whatever signals are present on the storage capacitors and move the respective cylinders to the desired positions in each axis.

When the hold-run switch 751 is closed to momentarily halt the manipulator apparatus, the multiplex portion of the control system is still functioning even though the inputs to the servo amplifier 690 are grounded. In order to facilitate servicing of the control system, and particularly a single axis thereof, facilities are provided for stopping the ring counter 530 on a particular output lead thereof so that signals will be continuously supplied to the multiplex and distributor scanning points corresponding to a particular selected one of the controlled axes. To this end, an inhibit oscillator switch 770 is provided having five positions connected to the five distributor output conductors of the ring generator 530 and a sixth position 772 which is open. The oscillator switch 770 is normally operated in the open position 772 in which no inhibit pulses are fed back to the oscillator 532. However, when it is desired to stop the ring generator 530 and the flip-flop 531 on a particular one of the output conductors 534–542, so that operation in the axis corresponding to said channel may be examined on a DC basis rather than a multiplex basis, the switch 770 is thrown to a desired one of the contacts and distributor pulses on that conductor are fed back to the oscillator 532 to stop this oscillator at a particular time when the flip-flop circuit 531 and the ring generator 530 are developing pulses corresponding to that same output conductor. For example, if it is desired to examine the out-in axis, the switch 770 is thrown to the position 774 in which pulses appearing upon the conductor 542 are fed back to the oscillator 532 to cause this oscillator to stop development of 10-kc. pulses. The flip flop circuit 531 and ring counter 530 then remain with an output signal continuously produced on the conductor 542 and no output signals are developed on the conductors 534, 536, 538 and 540. The field effect transistor 666 is thus continuously energized to supply the analog voltage developed on the conductor 664 to the storage capacitor 676. In this connection, it will be understood that the multiplex input switches 416 and 446, which are likewise controlled by the ring counter 530, are similarly controlled to continuously connect the signals appearing at the scanning points 406 and 436 to the inputs of the Gray to binary code converters 420 and 450, respectively, so that the comparator 422 is continuously comparing the encoder and command signals corresponding to the out-in axis. When it is desired to return to normal operation, the switch 770 is thrown to the position 772 so that the oscillator 532 is no longer prevented from generating pulses and normal multiplex operation is restored.

It will be recalled from the previous description of the system that signals indicating that completion of the commanded movement in each axis are derived from the direction circuits by detecting the condition in which neither a plus nor a minus signal is produced. Thus, in the out-in axis, when neither one of the AND gates 530 and 534 develops an output, the AND gate 540 has an output which sets the flip-flop 542 so that the potential on the conductor 576 changes from a negative value to ground. In a similar manner, when absolute coincidence is achieved in the other four axes, ground potential is produced on the conductors 578, 580, 582 and 584 so that the AND gate 574 develops an output signal which changes from a negative voltage to ground. This output, identified as ACCURACY NO. 1, is supplied through the OR gate 586 to a total coincidence AND gate 780. The total coincidence AND gate 780 has a number of other inputs besides the OR gate 586 which are indicated by the terminal 781. Thus, the AND gate 780 may receive a wait external signal from other apparatus interconnected with the manipulator apparatus, or a time delay signal coordinated with the operation being performed, as well as certain option signals which have been programmed into the memory drum and are derived from the buffer storage register 392. Only when all of these optional and external functions have been performed in connection with a particular programmed step is an output developed by the total coincidence AND gate 780 and is supplied through an auto-step switch 782 to the memory control circuits. The auto-step switch 782 is normally closed so that the total coincidence signal is fed to the control circuits 380 which respond to this coincidence pulse by transferring information previously stored in the shift register 366 into the buffer storage register 392 by means of the parallel transfer circuits 390. The control circuits 380 also respond to the total coincidence pulse by stepping the relay selector system 374 to the next head 350 and reading the information in the selected program interval into the 80-bit shift register 366 after the information previously stored therein has been transferred by the circuits 390 to the buffer storage register 392. The multiplex comparator then acts on the new set of command signals applied thereto by moving the hand and arm assembly to the desired position in all five axes as determined by the commands set up by this next program step.

In the event that it is desired to halt the manipulator apparatus after a particular step has been performed, the auto-step switch 782 is opened. When this occurs the manipulator apparatus will move to the commanded position in all axes but the total coincidence pulse developed by the AND gate 780 is prevented from stepping the memory drum control circuits to the next program step. If the auto-step switch 782 is now closed and then reopened, a total coincidence signal is sent to the memory drum control circuit, during closure of the switch 782, but again the manipulator apparatus carries out only the next program step and then stops.

While the total coincidence output of the AND gate 574 indicates a movement of the hand and arm assembly to the desired position in each axis to an accuracy of approximately 0.050 inches, in many instances it is neither necessary nor desirable to require the manipulator apparatus to move to the exact programmed point in each axis before a new set of command signals is called up from the memory drum. On the contrary, if an artificial coincidence signal is developed while the error signal is still quite large, and this artificial coincidence signal is used instead of the absolute coincidence signal to cause shifting to the next programmed step, a considerable saving in the time required to complete a certain program is achieved over a system wherein the manipulator apparatus must be brought to the exact programmed point before going to the next programmed step. In the arrangement of the present invention, two such artificial coincidence signals are developed, which are identified as ACCURACY NO. 2 and ACCURACY NO. 3, and either of these signals may be employed instead of the absolute coincidence signal to control shifting to the next program step. The ACCURACY NO. 2 signal may be adjusted so that a shift to the next program step occurs with an error of anywhere from 0.050 inch to 1.5 inches. The ACCURACY NO. 3 signal may be employed to produce a shift to the next program step when the error signal is as large as 25 percent to 50 percent of the total movement possible in a particular controlled axis.

Considering first the arrangement which is provided to develop the ACCURACY NO. 2 signal, a second ladder network is provided which interconnects the levels S1–S7 of the output from the comparator 422. Thus, the series resistors 790 are connected in series with each of the input conductors S1–S7 and the resistors 792 join the right-hand sides of the resistors 790 to form a ladder network, the resistors 794 and 796 being connected from the top and bottom ends of the ladder to ground. The resistors 790, 794 and 796 all have a resistance value which is twice that of the resistors 792. It will be recalled that the output from the 11-stage ladder comprising the resistors 590 and 592, i.e., the voltage on the conductor 604, have a value of minus 6 volts with maximum error at the 11th level S11. However, due to the particular ladder configuration employed, this same maximum error voltage is developed at each level of the ladder when a maximum error signal at that level is experienced. Accordingly, a voltage is produced on the output conductor 798 of minus 6 volts when the digital error signals in the S1–S7 levels are all binary "one." Furthermore, up to this maximum error signal consisting of seven binary "ones" the voltage on the conductor 798 will increase from zero up to a maximum of minus 6 volts. However, when the error signal becomes slightly larger, as for example when the binary error signal consists of 10000000, all of the inputs at the S1–S7 levels are zeros, and the output voltage on the conductor 798 is ground. Accordingly, for error signals larger than the maximum seventh level error signal, the bound signal developed by the next higher level OR gate 508 is employed in connection with the development of the ACCURACY NO. 2 coincidence signal, the output from the OR gate 508 appearing on the conductor 800. The conductors 798 and 800 are supplied to an ACCURACY NO. 2 coincidence circuit indicated generally at 802 wherein a comparison voltage which is positive with respect to ground is developed at the arm of a potentiometer 804 connected between a plus 6 volts reference source and ground. The bound signal appearing on the conductor 800 is supplied through a summing resistor 806 to the input of a voltage crossing detector or modified Schmidt trigger circuit comprising the transistors 810 and 812, the resistor 806 being connected to the base of the transistor 810. In a similar manner the output conductor 798 of the ladder network 790, 792 is supplied through a summing resistor 814 to the base of the transistor 810. The arm of the potentiometer 804 is likewise supplied through a summing resistor 816 to the base of the transistor 810.

The emitters of the transistors 810 and 812 are connected through a common resistor 818 to a positive voltage supply and the collectors of these transistors are connected through the resistors 820 and 822 to a suitable negative supply voltage. The collector of the transistor 810 is connected through a resistor 824 to the base of the transistor 812 and this base is connected through a resistor 826 to the plus voltage supply.

The summation resistors 806, 814 and 816 function to take the algebraic sum of the voltages appearing on the conductors 800 and 798, and the voltage appearing at the arm of the potentiometer 804. Assuming that the error signal is larger than the maximum seventh level value, the OR gate 508 will, under these conditions be developing a negative voltage on the conductor 800 of minus 9 volts as determined by the reference diodes 598, 600, 602, etc. of the ladder network 590–592. If the potentiometer 804 is adjusted so that the voltage at its arm is plus 4 volts with respect to ground, then the circuit 802 is arranged to change the voltage on the output conductor 828, connected to the collector of the transistor 812, from a minus voltage to ground when the error signals on both of the conductors 800 and 798 become smaller than minus 4 volts. The bound signal appearing upon the conductor 800 is of course much larger than minus 4 volts and until the error signal decreases in magnitude to the maximum seventh level value, the bound signal on the conductor 800 prevents the circuit 802 from developing an output signal. When the error signal decreases to the maximum seventh level value, the output of the OR gate 508 goes to ground and remains at ground for all smaller amplitude error signals. However, the voltage on the conductor 798 i.e. the output of the auxiliary ladder 790, 792, has an output of minus 6 volts at the maximum seventh level value. Accordingly, the algebraic sum of the voltages applied to the input of the Schmift trigger circuit 810, 812 is still such as to prevent an output signal from being developed on the conductor 828. When the error signal decreases to a still smaller value such that the voltage on the conductor 798 becomes smaller than minus four volts, as for example when it falls to minus 3 volts, the algebraic sum of the inputs supplied to the transistor 810 is now positive, the transistor 810 is rendered nonconductive and the transistor 812 is rendered conductive so that the voltage on he conductor 828 changes from the negative supply voltage to ground. This negative going signal is an artificial coincidence signal since it occurs while the error signal derived from the ladder network 790, 792 is still minus 3 volts. This artificial coincidence signal is now employed instead of the ACCURACY NO. 1 signal as a total coincidence signal which is employed to shift the memory drum to the next program step. However, this total coincidence shift does not take place until all five of the controlled axes have error signals less than the value arbitrarily established by the setting of the potentiometer 804. Thus, it is necessary to prevent the development of a positive going output signal until all five axes have been reduced to the desired maximum error value.

To this end, the conductor 828 is coupled through a diode 830 to a storage capacitor 823 across which is connected a leakage resistor 834 of large resistance value. During normal operation the transistor 812 is cut off and the capacitor 832 remains charged to the negative voltage of the supply connected to the collector resistor 822 through the diode 830. However, if one of the controlled axes has an error signal which is less than the voltage at the arm of the potentiometer 804 the transistor 812 is rendered conductive, the diode 830 is rendered nonconductive and the capacitor 832 start to discharge slowly through the resistor 834. If one of the other controlled axes has an error signal which is larger than the potential at the arm of the potentiometer 804, the circuit 802 will respond thereto, when that axis is scanned, by changing the potential on the conductor 828 back to a negative voltage so that the capacitor 832 is quickly charge back to the negative supply voltage through the diode 830 and the resistor 822. Accordingly, the capacitor 832 will be recharged back to the negative supply voltage when only one axis still has an error greater than the setting of the potentiometer 804. However, when all five of the controlled axes have error signals which are less than the value established by the arm of the potentiometer 804, the transistor 812 remains continuously conductive, the diode 830 is continuously cut off, and the capacitor 832 discharges completely so that the voltage across it changes from a negative value to ground. Preferably, the resistor 834 has a value approximately 5 and ½ times as large as the collector resistor 822 so that the capacitor 832 will not discharge at such a rate as to produce an output signal with a large error on one out of the five axes but will respond rapidly to produce such a signal when all five axes are within the desired error range.

The positive going artificial coincidence signal which is thus developed across the capacitor 832 when all five controlled axes have an error signal less than that established by the potentiometer 804 is applied as one input to a two-input AND gate 836. The other input of the AND gate 836 consists of a positive going signal which is supplied from the register 392 if the particular program step being carried out has previously been recorded as to be performed at ACCURACY NO. 2 during the teaching operation by adjustment of the accuracy selector switch 385 (FIG. 6) to the ACCURACY NO. 2 position. Assuming this to be the case, the AND gate 836 will then develop an output which is applied as a positive going signal to the second input of the OR gate 586. Since this positive signal will always occur prior to the development of the ACCURACY NO. 1 signal, due to the fact that the artificial coincidence signal developed by the circuit 802 occurs while there is still an actual error signal and hence the AND gate 574 will not have developed an output at that time. The ACCURACY NO. 2 signal is transmitted through the OR gate 586 to the AND gate 780. Upon completion of the other signals supplied to the AND gate 780, a total coincidence signal will then be developed in the output of the AND gate 780 and supplied to the memory control circuits to shift to the next program step.

The ACCURACY NO. 3 signal is derived in a manner similar to the ACCURACY NO. 2 signal, except that the ACCURACY NO. 3 signal is derived from the upper end of the main ladder network 590, 592. More particularly, the voltage on the output conductor 604 of this ladder network is supplied to an ACCURACY NO. 3 coincidence circuit, indicated generally at 840, and the output from the OR gate 500 is supplied by way of the conductor 842 to the other input of the circuit 840. The circuit 840 is identical to the circuit 802 and includes a potentiometer corresponding to the potentiometer 804 which may be adjusted to any value from plus six volts to ground. Accordingly, the circuit 840 continuously compares the potentials on the conductors 604 and 842 with the potential of the artificial coincidence setting potentiometer in the circuit 840 and develops a ground signal on the output conductor 844 whenever the voltages on these conductors become less than the artificial setting in any axis. A storage capacitor 846 is charged through the diode 848 in response to the negative voltage normally appearing on the conductor 844 and is discharged at a slow rate through the resistor 850 which corresponds to the resistor 834. The resulting ACCURACY NO. 3 signal developed across the capacitor 846 is supplied to an AND gate 852 having as its other input an ACCURACY NO. 3 signal derived from the register 392 only if the particular programmed step which is being carried out is to be performed only to ACCURACY NO. 3 requirements. Assuming this to be the case, the output of the AND gate 852 is supplied to the third input of the OR gate 586, and when other options are fulfilled, a total coincidence signal is supplied to the memory control circuits to cause a shift to the next programmed step.

Considering now the type of movement which the manipulator arm may be made to perform when employing the above-described ACCURACY NO.3 signal, it will be recalled that the rotary axis encoder 326 has 13 digits, whereas the output from the ladder network 590, 592, which appears on the conductor 604, is derived from the 11th binary digit S11. Accordingly, when the error signal is slightly less than one-fourth the total possible movement in the rotary axis, the potential on the conductor 604 starts to decrease from a maximum error value of minus 6 volts. If the potentiometer 804 in the ACCURACY NO. 3 coincidence circuit 840 is adjusted to a plus 6-volt value, it will be evident that an ACCURACY NO. 3 output signal will be developed by the circuit 840 as soon as the error in the rotary axis is 25 percent of the total possible movement in this axis. This means that the manipulator arm, when programmed to ACCURACY NO. 3, may be made to move in a curved path over distances of many feet, thus accomplishing a substantial saving in the time required to perform a predetermined series of steps. Thus, referring to FIG. 15, it may be assumed that the manipulator arm has been programmed at ACCURACY NO. 3 to move in the rotary axis as indicated by the arrow 860, and in the down-up axis as indicated by the arrow 862 and to move successively to points one, two, three and four. Specifically, it is assumed that the manipulator apparatus was taught point one as the first programmed step, point two as the second programmed step, point three as the third programmed step, and point four as the fourth programmed step, together with a recorded bit indicating end of program.

Assuming that the manipulator arm is positioned at point one, total coincidence is immediately indicated for the first program step, and when the next program step is produced in the register 392, the manipulator arm starts to travel toward point two along the path indicated in dotted lines at 864 and the path indicated by heavy lines at 866. However, when the manipulator arm reaches the point 868, it is assumed that the ACCURACY NO. 3 artificial coincidence signal is produced while an error signal equal to the distance 870 still exists between the position of the manipulator arm and the desired point two. As indicated above, this distance 870 may be as large as 25 percent of the entire movement of the manipulator arm in the rotary axis. When a total coincidence signal is produced in response to the ACCURACY NO. 3 signal produced at point 868, the command signals in the register 392 are immediately changed to call for the position of point three even though point two has not been reached. This means that in addition to an error signal in the down-up axis of the total distance between points two and three, there also exists an error signal in the rotary axis equal to the distance 870. This is because the encoders in each axis measure the absolute position of the controlled part and hence the error distance 870 is not lost when transferring from the second program step to the third program step. Accordingly, as the manipulator arm starts downwardly toward point three, the error represented by the distance 870 is closed out in the rotary axis with the result that the manipulator arm undergoes a curved path movement indicated at 872 which lasts until the error 870 in the rotary axis has been completely closed out after which the manipulator arm moves only in the vertical direction as indicated by the path 874. In this connection, it is pointed out that since the command signal relating to point three is immediately transferred to the register 392 by the transfer circuits 390 without waiting for access to the memory drum itself, the new command signal is immediately available as soon as the ACCURACY NO. 3 signal is produced, thus making possible continued motion of the arm without deceleration.

When the manipulator arm reaches the point 876 at which it is assumed an ACCURACY NO. 3 coincidence signal is obtained, the memory output is shifted to the next program step and calls for the position at point four so that the manipulator arm undergoes another curved movement 878 followed by a movement in the rotary axis indicated by the path 880. When the manipulator arm reaches the point 882 at which it is assumed that an ACCURACY NO. 3 signal occurs, the end of program bit restarts the program cycle so that the position of point one is called for and the manipulator arm traverses the paths 884 and 886 to the point 888 at which an ACCURACY NO. 3 coincidence signal associated with point one is developed, the position of point two is again called for and the manipulator apparatus traverses the curved path 890 and then repeats the cycle which began with the path 866.

This programming of the manipulator arm to follow the above described curved paths 872, 878, 884 and 890, has the important advantage that the manipulator arm may in effect sense the new position on the fly and before it has completed the first program step so that the manipulator arm may be kept moving at a relatively high velocity through a number of movements in different directions without ever coming to a halt. For example, when the manipulator arm is traversing the curved path 872, the arm is slowing down in the rotary axis but at the same time the arm is accelerating in the down-up axis so that the composite velocity vector of the manipulator arm stays at a high value. Accordingly, a substantial saving in the time required to move the manipulator arm through a series of operations is provided over an arrangement wherein the arm must be brought to a halt at points three and one, for example, in the illustration of FIG. 15. As an example of such a saving in time, in a horizontal upset forging operation, wherein the manipulator arm is required to move a part into and out of a series of progressive cavities in the forging die in sequence, the above described programming of the manipulator arm to ACCURACY NO. 3 results in a saving of 8 seconds in an operation which would take a total of 40 seconds if the manipulator apparatus is brought to a halt at each change in direction. Furthermore, this saving is accomplished without requiring an increase in the maximum speed of movement of the manipulator arm.

It will be understood that while the illustration in FIG. 15 has been given on a two-dimensional basis, the manipulator arm may be programmed equally well to accomplish curved motions on a three-dimensional basis. Thus, for example, the illustration in FIG. 15 could be programmed with points one and two at full extension of the manipulator arm and with points three and four at full retraction of this arm. Under such conditions, the manipulator arm would move in three-dimensional curved paths as the errors in the signal are closed out during movement in various axes to the next programmed point.

The ACCURACY NO. 3 coincidence signal may also be made to occur in certain axes while errors exist which are greater than the 25 percent point discussed previously in connection with the rotary axis. Thus, considering the out-in axis, which is a ten bit number, it will be recalled that two dummy digits are provided by the conductors 400 and 402 below the least significant digit of the actual signal developed by the encoder 310. Accordingly, the out-in encoder signal is equivalent to a 12-bit number. Since the output signals for the ACCURACY NO. 3 coincidence signal is derived from the eleventh level of the binary error signal, it will be evident that the voltage on the conductor 604 starts to decrease from its maximum value of minus 6 volts as soon as the error becomes less than 50 percent of the total movement permitted in the out-in axis. Accordingly, the ACCURACY NO. 3 shift to the next programmed step may take place at 50 percent of full stroke in the out-in axis so that complete circles can be traversed by appropriate programming of the manipulator arm. The wrist swivel encoder 324 is likewise provided with two dummy digits below the least significant digit so that the ACCURACY NO. 3 signal may take place at 50 percent of full stroke in this axis also. Also, with regard to the down-up encoder 314, and the wrist bend encoder 322, these encoder signals are 11-digit numbers and a single dummy digit is provided below the least significant digit so that here again the ACCURACY NO. 3 coincidence signal may occur at 50 percent of full stroke in each of these axes. The provision of the above-described dummy digits, such as the conductors 400 and 402, also means that a maximum error signal can be produced at the output conductor 604 for large errors in the respective axes. If these conductors were omitted, then the maximum error in the out-in axis would comprise binary ones on all of the conductors S1–S10 which would still function to give only minus 3 volts on the conductor 604.

Programming of the manipulator arm to ACCURACY NO. 3 has further advantages when the movement of the manipulator arm is to be coordinated with externally generated signals. For example, it is assumed that in moving from point two to point three in FIG. 15, the manipulator arm must receive a wait external signal when it reaches point two indicating that a barrier indicated by the dotted line 892 between the positions two and three has been removed. Under these conditions the manipulator arm has been taught point two at ACCURACY NO. 3 and a wait external signal (WX) is also programmed into the memory drum at this step. When the point 868 is reached by the manipulator arm, the shift is made to the program step associated with point three if a wait external signal is also present at that time indicating that the barrier 892 has been removed. The arm then proceeds along the path 872 without substantial reduction in speed. On the other hand, if no wait external signal is present when the arm reaches point 868, thus indicating that the barrier 892 has not been removed, the manipulator arm will simply close out its movement in the rotary axis and come to a halt at point two. When the barrier 892 is removed a WX signal is received and the arm moves toward point three. The arm thus starts on its movement toward point three at the earliest possible moment no matter when this occurs. This type of operation is particularly important when the manipulator apparatus is used in conjunction with continuously operating presses, and the like, because synchronism can be maintained with the press operation (the wait external signal being produced when the press is open) so that operation commensurate with conventional safety interlock practices is achieved.

The ACCURACY NO. 2 and ACCURACY NO. 3 potentiometers 804 are preferably located in the control cabinet 42 and may be accessible through a panel 43 located on the right-hand end of this cabinet. When the manipulator arm has been programmed to move through a series of motions at ACCURACY NO. 3, as described in connection with FIG. 15, the potentiometer 804 in the ACCURACY NO. 3 circuit 840 is first adjusted so that the arm thereof is at ground potential. This means that the error signal on the conductor 604 has to decrease clear down to ground potential before an ACCURACY NO. 3 coincidence signal is developed in the output of the circuit 840. Accordingly, the manipulator arm will move all the way to point two, for example, in a manner similar to its movement if the program step were to be carried out at ACCURACY NO. 1. After observing the motion of the manipulator arm under these conditions, the operator can, during successive repeat cycles, adjust the potentiometer 804 to give higher and higher values which will provide ACCURACY NO. 3 coincidence signals at larger and larger errors from point 2. The operator can, therefore, adjust the point at which the manipulator arm starts its curved path 872, i.e., the time at which a shift is made to call for the position of point 3. This adjustment of the potentiometer 804 is customarily made to adapt the manipulator arm to the particular conditions of load and path of movement so that maximum velocity is achieved as permitted by other factors entering into the operation. In this connection, it is pointed out that the operator may manually operate relay 738, from a switch on the control panel 44, so that the arm may be moved at an elected slow speed in order that the operator may critically determine the desired setting of the potentiometer 804.

Referring now to FIG. 13, a preferred arrangement is therein illustrated for the servo valves which are employed to actuate the hydraulic cylinders of the manipulator apparatus. For example, the servo valve shown in FIG. 13 may constitute the wrist swivel servo valve 186 which is employed to actuate the wrist swivel hydraulic cylinder 100. The system hydraulic supply is indicated generally at 900 and supplies fluid under pressure of approximately 800 p.s.i. through the conduit 902a to the main housing conduit 904. The servo valve 186 is of the coaxial pilot spool-main spool feedback type and fluid from the supply 900 is supplied through the conduit 904 to the main spool 906 and through a filter element 908 to a pilot spool 910. The input coil 538 of the servo valve 186 is in the form of an elongated light-weight coil, similar to the voice coil of a loudspeaker, which is wound on a light-weight coil form 911 and is positioned within an annular air gap 912 formed in a magnetic structure comprising an annular permanent magnet 914 which is positioned between bottom and top members 916 and 918. Preferably, the coil 538 comprises several hundred turns of fine wire wound on the outside of the coil form 911 which has a diameter of 2 inches. Connection is established to the input coil 538 from the input terminals 920 by means of the flexible leads 922 and 924. The coil form 911 is supported at the center thereof in a light-weight hub 930 which is also connected to a pair of corssed, flat strip supporting elements 928 the outer ends of which are supported on posts 926 mounted on the top plate 918 on a circle of approximately 4 inches diameter. Within the hub 930 a null adjustment screw 932 is positioned which is connected to one end of a wire ling 934 the other end of which is connected to the pilot spool 910 so that the pilot spool 910 is moved linearly in response to current changes in the coil 538. An anti-buckling tube 936, which is loosely retained within an inner sleeve portion 938 of the hub 930 and has a length approximately 1 thousandths of an inch shorter than the wire link 934, is provided to prevent buckling of the wire link 934 under large compression loads.

The electromagnetic structure thus described is supported on and spaced from one end of the housing 902 by means of the posts 940 so that a solid unitary structure is provided in which movement of the coil 538 and the wire link 934 is coaxial with the pilot spool 910 and the main spool 906.

The bidirectional outlet ports 942 and 944 of the main housing 902 are connected by way of the conduits 196 and 198, respectively, to the opposite ends of the hydraulic cylinder 100 so that bidirectional fluid flow to either side of the piston 102 is produced in accordance with the position of the main spool 906. The light-weight flexible supporting strips 928 function to support the input coil 538 at a neutral position within the air gap 912 and the null adjustment screw 932 may be adjusted so as to provide the optimum hydraulic position of the pilot spool 910 and main spool 906 when no current is supplied to the coil 538. With the described arrangement, the coil 538 may have a movement of 0.110 inches each side of its neutral position for maximum current inputs so that a long stroke, light-weight electromagnetic actuator is provided for the pilot spool 910. The response of the servo valve is thus very fast, being in the order of 30 cycles per second or more, so that the manipulator arm may be moved at high rates of speed and decelerated quickly to the desired end position. Furthermore, by providing a long stroke for the pilot spool 910, direct hydraulic feedback between the main spool 906 and the pilot spool 910 is sufficient without providing external mechanical feedback linkages.

The area 950 of the main spool 906 has a shoulder differential area exactly one-half that of the area 952. Accordingly, the main spool 906 will move in response to pressure differential until the pressure in chamber 954 is just one-half the supply pressure, thus balancing the forces on the areas 950 and 952. When a current of predetermined magnitude and polarity is applied to the terminals 920, the coil 538 is moved away from its center position and adjusts the position of the pilot spool 910 accordingly. The resulting change in pressure in the chamber 954 results in a differential pressure exerted on the main spool 906 which is moved in the correct direction to bring the main spool 906 to a position in which the forces on the areas 950 and 952 are again balanced and the pressure in the chamber 954 is again equal to one half the supply pressure. The position of the main spool 906 is therefore made to follow very accurately the position of the pilot spool 910 which is in turn determined by the magnitude and direction of current flow in the coil 538. Accordingly, bidirectional fluid flow is produced in the outlet ports 942 and 944 corresponding to the current supplied to the coil 538. When this current is removed from the coil 538, the supporting strips 928 act as a return spring to return the coil 538 to its mid-position. Application of a current of the opposite polarity to the coil 538 will result in its movement in the opposite direction from the null position with consequent movement of the pilot spool 910 and the main spool 906 in the other direction.

In accordance with an important feature of the invention, the current-flow characteristic of the servo valves, such as the servo valve 186, is made to follow a square law so that for small values of current, i.e., when the error signal is small, the valve will be relatively insensitive. Thus, at low values of current, where current fluctuations, temperature variations, etc. would affect the operation, the servo valve is made relatively insensitive so that a large change in current is required to give a predetermined percentage change in flow. Such a square law characteristic has the further advantage of overcoming the hysteresis effect which is experienced when the coil 538 is moved within the air gap 912. Furthermore, the pilot spool-main spool combination is so positioned with respect to the outlet ports 942 and 944 of the main housing 902 that no valve opening is produced, and hence no fluid flows, until the current has increased to approximately 5 percent of its maximum value. Such an overlap insures a very low leakage through the servo valves and hence very little change in the position of the hydraulic cylinders even when the manipulator apparatus is turned off. Accordingly, the position of the manipulator arm does not change while not in use since the oil in the cylinders cannot leak through their respective servo valves.

The current-flow characteristic of each servo valve, such as the servo valve 186, preferably has a characteristic such as shown in FIG. 17. Referring to this figure, it will be seen that the flow characteristic 960 has zero flow at approximately 5 percent current input and follows a square law characteristic up to the 100 percent point. Such a square law characteristic is preferably obtained by providing triangularly shaped outlets in each direction of flow from the output ports 942 and 944 for each servo valve. Thus, as shown in FIG. 16, each half of the outlet ports preferably has a triangular opening 962. The main spool closure member, indicated by the dotted line 964, is normally positioned beyond the left-hand corner of the triangle 962 so that no area A of the outlet port is exposed. It will be noted that the area A changes as the square of the motion of the closure member 964 so that the desired square law flow characteristic 960 is obtained. Since the outlet ports 942 and 944 are bidirectional flow outlets, each of these outlet ports is in actual practice, preferably diamond shaped to provide the desired square law characteristic of flow versus current in each direction.

While the above-described square law characteristic for the servo valves is desirable from the standpoint of minimizing errors at low current values, and to overcome hysteresis effects, the desired deceleration characteristic of the boom assembly 50, requires an oppositely shaped characteristic. In accordance with a further important feature of the invention, the shape of the analog error output voltage characteristic derived from the function generation networks 608, 612, 616, 620, 625, 628 and 630 is chosen not only to compensate for the inverse square law valve characteristic, but also so that a desired overall deceleration characteristic is achieved. Thus, referring to FIG. 18, a desired deceleration characteristic would be one in which the velocity continues at a constant value as indicated by the straight line portion 966 and at a predetermined point 968 the velocity of the manipulator apparatus decreases linearly along the straight line 970 to zero, at point 972. Such a straight line decrease 970 would correspond to a constant deceleration and would produce the minimum elapsed time between points.

The manipulator apparatus is designed to withstand acceleration and deceleration forces of approximately 2 G's, i.e., 64 feet per second per second. It would be desirable to provide an actual deceleration characteristic which is as close as possible to the design value of 2 G's without exceeding this value. However, since the manipulator apparatus has certain spring rates and inertias, and since both the hydraulic fluid and steel parts of the manipulator apparatus are somewhat compressible, the shape of the deceleration characteristic provided by the output of the digital-to-analog converter networks is made somewhat less than this ideal value. More particularly, and still referring to FIG. 18, it is assumed that the velocity has a constant value 974 as the controlled part approaches the desired end point 972. At the point 968 the error signal decreases from its maximum value and the velocity of the manipulator arm decreases along the characteristic 976. If an ideal straight line deceleration characteristic were to be produced, the curve 976 would be a parabola having a fourth power curvature. This would mean that the characteristic 976, when combined with the current-flow valve characteristic 960 would provide an overall deceleration characteristic having a curvature of the power of 2, i.e., would correspond to the ideal velocity-time characteristic 970. However, as mentioned above, such an ideal characteristic is not possible due to the physical characteristics of the manipulator apparatus. Accordingly, the deceleration characteristic 976 produced by the analog function generation networks has a shape closely corresponding to a parabola of approximately the power 3.5. When this characteristic is combined with the inverse square law characteristic 960 the composite deceleration characteristic of the apparatus in each controlled axis is a parabola to the power of approximately 1.75. Such a deceleration characteristic brings each controlled axis to the desired end point in a minimum length of time commensurate with the design limitations of the apparatus itself. It should also be pointed out that even if A conventional linear flow servo valve is employed, the deceleration characteristic 976 should still be in the form of a parabola, but to the approximate power of 1.75 rather than 3.5, so that the manipulator arm is brought to the desired end point in a minimum length of time. If the characteristic 976 is made to be a straight line, as in classic servo systems, the time required to reach the final position would be prohibitively greater.

It should be noted that when the deceleration characteristic 976 is in the form of a parabola to a particular power, the same deceleration characteristic may be employed with servo valves having widely different maximum flow ratings. Thus, the same servo valve and analog error signal combination may be used with axes having widely different flow requirements. For example, in the rotary axis, a flow of 16 gallons per minute may be required for maximum slewing speed, whereas in the wrist bend axis a flow of only 4 gallons per minute is required for maximum slewing speed. The same servo valves may be employed for both axes and the damping potentiometers 688 (FIG. 11) in each axis are adjusted to provide the required sensitivity in each servo amplifier 690 so that the proper fluid flow is provided in each axis to produce the maximum slewing rate. However, despite such variation in the scale of the individual servo systems, due to the fact that the deceleration characteristic 976 is a parabola whose shape remains the same regardless of scale, it may be combined with the parabolic valve characteristic under widely differing maximum flow requirements for the various axes and still provide the desired composite parabola so that the same dynamic performance will be obtained from all axes.

As discussed heretofore the teach controls 306 are preferably contained in a remote teach control assembly which may be connected by means of a flexible cable to the control cabinet 40 so as to permit the operator to position himself at any desired observation point while setting up the manipulator apparatus program during the initial teaching operation. For example, if the manipulator apparatus is to remove hot parts from a furnace the teaching operator must necessarily be standing safely away from the throat of the furnace. More particularly, referring to FIGS. 19, 20 and 21, the remote teach control assembly is illustrated therein as comprising a pistol type structure indicated generally at 980 provided with a barrel portion 982 and a handle portion 984. Preferably, the barrel portion 982 approximates the shape of a protective cover which normally encloses the boom assembly 50 so that the operator is assisted visually in establishing proper orientation between the push buttons on the barrel 982 and their effect on the manipulator apparatus during the teaching operation. The handle portion 984 is provided with an arming trigger 986 which controls the closure of an arming switch 371 (FIG. 6) which is connected in series to ground with all of the potentiometers employed in the teach control circuits 374, 382, 284, 386 and 388, such as the potentiometers 370 and 372 provided for the out-in axis. The arming switch 371 is normally open so that no voltage is available for the servo valves of the controlled axes. However, when the operator grasps the handle 984 and depresses the arming trigger 986, the switch 371 is closed in all of the circuits 374, 382, 384, 386 and 388 so that these circuits are all enabled. The arming trigger thus prevents undesired movements in each axis in the event the assembly 980 is laid down in such position that one or more of the push buttons mounted in the barrel 982 are inadvertently depressed.

The out button 376 for the teach control circuit 374 is positioned in the rear wall in the barrel 982 and the in button 380 is provided in the forward end of this barrel. Corresponding arrows 990 and 992 are provided on the top surface of the barrel 982 to inform the operator of the direction in which the manipulator arm will move when either of these buttons is depressed.

In a similar manner the buttons 994 and 996 are provided in the top and bottom surfaces of the barrel 982 and are included in the circuits 384 to control the down-up servo valve 174. The buttons 998 and 1000 are likewise provided in the top and bottom surfaces of the barrel 982 for movement in the wrist bend axis. The buttons 1010 and 1012 are provided for controlling movement in the wrist swivel axis and the arrows 1002 and 1004 indicate to the operator the corresponding movement in this axis of the manipulator hand. Finally, the buttons 1014 and 1016 are provided to control rotation of the boom assembly about the vertical axis of the column 60, as indicated by the arrows 1006, 1008. As is clearly evident from FIGS. 19 and 20, all of the described push buttons are positioned within recesses in the barrel 982 to prevent inadvertent operation of the wrong button during the teaching process.

An accuracy selection knob 1020 is located on the top surface of the barrel 982 and may be thrown to any one of three positions identified as ACCURACY NO. 1, ACCURACY NO. 2 and ACCURACY NO. 3. The knob 1020 controls a three position accuracy selector switch 385 (FIG 6) the movable contact of which is connected to ground. When the knob 1020 is moved to the ACCURACY NO. 3 position, the switch 385 grounds the conductor 381. In the ACCURACY NO. 2 position the conductor 383 is grounded and the ACCURACY NO. 1 position of the switch 385 is open. A pair of clamp controls 1022 and 1024 are also provided on the upper surface of the barrel 982. One of these controls is employed to close clamp switch 384 (FIG. 6) which grounds conductor 391. The other one of these controls may be employed to control a second clamp switch in the event that a special hand assembly requires the actuation of two air cylinders. When the push buttons controlling movement in the desired axes have been depressed for sufficient periods of time to bring the manipulator arm to the desired position the accuracy knob 1020 has been positioned to select a desired accuracy with which the arm is to be moved to this end point, and the clamp control 1022 has been actuated if the hand clamping device is to be closed, the record button 340 is depressed so that all necessary information is transferred to the register 366 and is stored in the memory drum 300.

The teach control assembly 980 is also provided with a jog button 1026 closure of which closes the jog switch 389 (FIG. 6). Closure of this switch functions to increase the voltages supplied to all of the teach control potentiometers, such as the potentiometers 370 and 372, so that the manipulator arm may be moved at a more rapid speed to a desired point during the teaching operation.

All of the conductors for the above-described teaching operations are contained in a cable 1028 which is employed to interconnect the remote teach control assembly 980 with the manipulator apparatus. Specifically, the cable 1028 is arranged to be plugged into a junction box 51 provided in the right-hand side of the control cabinet 42 during the period when the manipulator apparatus is being taught a particular program of operations.

In connection with the function generation networks employed in the digital to analog converter to develop the deceleration characteristic 976, it is noted by way of example, and not in any sense by way of limitation, that the resistors 642 may have a value of 75,000 ohms in all networks except network 630 in which network this resistor has a value of 15,000 ohms. The resistor 650 may have a value of 110,000 ohms in all networks except 630 in which network this resistor has a value of 27,000 ohms. The resistor 632 may have a value of 6,200 ohms.

While but a single embodiment of the present invention has been here specifically disclosed, it will be apparent that many variations may be made therein, all within the true spirit and scope of the invention.

What is claimed as new and desired to be secured by Letters Patent of the United States is:

1. In a programmed manipulator apparatus, the combination of, a manipulator arm, means for moving said arm in a plurality of different axes, means for developing command signals representing a desired position of said arm in each of said axes, means for developing a position signal representing the position of said arm in each of said axes, comparing means common to said axes for comparing command and position signals and developing an error signal proportional to the difference therebetween, and means for sequentially connecting said comparing means to different command and position signal combinations corresponding to movement in different ones of said axes during different periods in a repetitive multiplex scanning cycle.

2. The combination of claim 1, wherein there is provided a storage circuit for each of said axes, and means for distributing error signals to said storage circuits during the multiplex period when the corresponding command and position signals are connected to said comparing means.

3. The combination of claim 2, wherein said distributing means is effective only during the latter portion of each multiplex period of said multiplex scanning cycle.

4. The combination of claim 2, wherein said comparing means includes means for developing a digital error signal representing the numerical difference between said command and position signals, and means for converting said digital error signal into an analog error signal which is successively applied to said storage circuits.

5. The combination of claim 4, wherein said analog signal has a velocity-position characteristic which is in the shape of a parabola.

6. The combination of claim 5, wherein said arm moving means including hydraulic actuator means and servo valve means for controlling said hydraulic actuator means, said servo valve means having a control characteristic which is inversely related to said velocity-position characteristic of said analog signal.

7. In a programmed manipulator apparatus, the combination of, a manipulator arm, hydraulic actuator means for moving said arm in a given axis, servo valve means for controlling said actuator means, electromagnetic means for controlling said servo valve means, said servo valve means having a square law control characteristic, means for developing a command signal corresponding to the distance to be moved in said axis, means for developing a position signal corresponding to the position of said arm in said axis, means for comparing said position signal with said command signal to derive an error signal having a velocity-position error characteristic opposite to that of said servo valve means, and means for supplying said error signal to said electromagnetic means.

8. In a programmed manipulator apparatus, the combination of, a manipulator arm, means for moving said arm along a predetermined path, means for developing a digital command signal representing a desired position of said arm, means for developing a digital position signal representing the actual position of said arm, means for comparing said command and position signals to develop a digital error signal, a ladder network, means coupling individual digits of said error signal to different levels of said ladder network, means for combining the outputs of a plurality of levels of said ladder network to provide an analog error signal the shape of which is in the form of a parabola, and means for applying said analog error signal to said arm moving means to move said arm to said desired position.

9. The combination of claim 8, wherein said arm is moved in a plurality of axes and said comparing means is sequentially connected to different command and position signal combinations corresponding to movement in different ones of said axes during a multiplex cycle, a storage circuit for each of said axes, and means for distributing said analog error signal to said storage circuits during the multiplex period when the corresponding command and position signals are connected to said comparing means.

10. The combination of claim 1, wherein said position and command signals are digital and said comparing means develops digital error signals equal to the difference therebetween, said comparing means being also arranged to develop a final carry or borrow pulse when one of said position and command signals is larger than the other, and direction determining means controlled in part by said final carry or borrow pulse for controlling the direction of movement of said arm moving means along the corresponding axis.

11. The combination of claim 10, wherein there is provided means for developing a control signal when said command signal and said position signal are not equal, and means for controlling in part said direction determining means by said control signal.

12. In a programmed manipulator apparatus, the combination of, a manipulator arm, means for moving said arm in a plurality of axes, a magnetic storage medium, encoder means for developing a plurality of binary code signals representing the absolute position of said arm in said plurality of axes, means for developing successive clock periods in successive program intervals, recording means arranged to develop a flux change of one polarity in said medium during the latter half of any one of said clock periods which represents a binary digit of "1" and arranged to develop a flux change of opposite polarity in said medium during the latter half of any one of said clock periods which represents a binary digit of "0," and teach control means for controlling said recording means in accordance with said encoder signals to record binary code signals on said medium corresponding to a particular position of said manipulator arm.

13. The combination of claim 12, wherein said storage medium comprises a continuously rotating storage drum, and said recording means includes a plurality of heads adjacent the periphery of said drum, repeat control means for utilizing said heads to produce command signals corresponding to said recorded flux changes, means for comparing said command signals with signals from said encoder means and developing error signals equal to the differences therebetween, and means utilizing said error signals to move said arm to different positions.

14. In a programmed manipulator, the combination of, a manipulator arm, means for moving said arm along a plurality of axes, encoder means for developing a digital signal corresponding to the absolute position of said arm in one of said axes, means for developing a sequence of digital command signals corresponding to desired positions of said arm along said one axis, means for comparing said encoder signal and one of said command signals in said sequence to develop an analog error signal equal to the difference therebetween, means responsive to said analog error signal for controlling said moving means to move said arm along said one axis in the direction to reduce said analog error signal, means for developing an artificial coincidence signal when said analog error signal is reduced to a predetermined magnitude, and means responsive to said artificial coincidence signal for connecting the next command signal in said sequence to said comparing means.

15. The combination of claim 14, wherein said artificial coincidence signal is produced while said analog error signal has a value representing a distance equal to a substantial percentage of the total movement of said arm in said one particular axis.

16. The combination of claim 14, wherein said comparing means develops a digital error signal, means for converting said digital error signal into a corresponding analog error signal, a reference voltage, and means for comparing said analog error signal with said reference voltage to develop said artificial coincidence signal.

17. The combination of claim 16, wherein said reference voltage is adjustable, thereby to vary the position along said one axis at which said artificial coincidence signal is produced.

18. In a programmed manipulator, the combination of, a manipulator arm, means for moving said arm along first and second axes, encoder means for developing first and second encoder signals corresponding to the position of said arm in said first and second axes, means for developing command signals corresponding to desired positions of said arm in said first and second axes, means for comparing said first and second encoder signals with their respective command signals to develop first and second error signals equal to the differences therebetween, and means for developing an artificial coincidence signal when both said first and second error signals have values representing a distance equal to a substantial percentage of the total movement of said arm in the respective ones of said first and second axes.

19. The combination of claim 18, wherein reference means are provided in association with said artificial coincidence signal developing means, and means for comparing said error signals with said reference means.

20. The combination of claim 19, wherein said reference means is an adjustable voltage source, adjustment of said source being effective to vary the position along each axis at which said artificial coincidence signal is produced.

21. In a programmed manipulator, the combination of, a manipulator arm movable along a plurality of axes, program means including a series of command signals specifying a sequence of positions to which said arm may be moved, control means responsive to said series of command signals for successively moving said arm toward the positions indicated by two successive ones of said command signals, and means modifying movement of said arm so that said arm moves toward the next position in the sequence before it reaches the positions indicated by said two command signals, the distance between the desired command signal position and the point at which said modifying movement commences being a substantial percentage of the total movement of said arm in at least one of said axes.

22. The combination of claim 21, wherein means are provided for adjustably varying the point at which said modifying movement commences independently of said program means.

23. In a programmed manipulator apparatus, the combination of, a manipulator arm mounted on a base member, means for moving said arm along a plurality of axes, storage means, means for storing digital information in said storage means, encoder means connected to said arm and arranged to develop digital encoder signals corresponding to the absolute position of said arm in each of said axes, a remote teach control assembly interconnected with said storing means through a single flexible cable and adapted to be gripped by a teaching operator, said teach control assembly having a physical shape which simulates generally the physical shape of said manipulator arm, means including push buttons located on said assembly for controlling said moving means to move said arm to a desired position, said push buttons being located on said assembly at points which are physically correlated with desired movement of said arm in each of said axes, a record button located on said assembly, and means including said record button for controlling said storing means to store the digital encoder signal corresponding to said desired position in said storage means.

24. The combination of claim 23, wherein said manipulator arm is movable along an in-and-out axis and two of said push buttons are located on the forward and rearward ends of said teach control assembly for controlling the in motion and out motion respectively of said arm.

25. The combination of claim 23, wherein said manipulator arm is movable in a down-up axis, and two of said push buttons are located on the top and bottom surfaces of said teach control assembly for controlling the down motion and up motion respectively of said arm.

26. The combination of claim 23, wherein said manipulator arm is provided with a pivoted hand on the outer end thereof which is movable in a wrist bend axis, and two of said push buttons are located on the top and bottom surfaces of said teach control assembly for controlling the wrist down motion and wrist up motion respectively of said hand.

27. The combination of claim 23, wherein said manipulator arm is provided with a pivoted hand on the outer end thereof which is movable in a wrist swivel axis, and two of said push buttons are located on the right and left sides of said teach control assembly for controlling the wrist left swivel motion and wrist right swivel motion respectively of said hand.

28. The combination of claim 23, wherein said manipulator arm is movable in a rotary movement about a vertical axis, and two of said push buttons are located on the right and left sides of said teach control assembly for controlling the rotary left motion and rotary right motion respectively of said arm.

29. In a programmed manipulator apparatus, the combination of, a manipulator arm, a rotatably mounted vertically extending member, means for supporting said arm on the upper end of said member, a ring gear connected to said member, a rack in engagement with said ring gear, hydraulic cylinder means for moving said rack so that said arm is rotated about the vertical axis of said member, a piston the end of which is in sliding engagement with said rack, and means for exerting a force on said piston which is greater than the maximum separating forces produced between said ring gear and said rack when said arm is accelerated and decelerated.

* * * * *